(12) United States Patent
Huttunen et al.

(10) Patent No.: US 9,154,417 B2
(45) Date of Patent: *Oct. 6, 2015

(54) UNINTERRUPTED TRANSMISSION OF INTERNET PROTOCOL TRANSMISSIONS DURING ENDPOINT CHANGES

(71) Applicant: Digifonica (International) Limited, Vancouver (CA)

(72) Inventors: Pentti Kalevi Huttunen, Vancouver (CA); Gavin Malcolm McMillan, Maple Ridge (CA)

(73) Assignee: DIGIFONICA (INTERNATIONAL) LIMITED, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,831

(22) Filed: Nov. 27, 2013

(65) Prior Publication Data

US 2014/0153477 A1  Jun. 5, 2014

Related U.S. Application Data

(63) Continuation of application No. 13/496,864, filed as application No. PCT/CA2009/001317 on Sep. 17, 2009, now Pat. No. 8,675,566.

(51) Int. Cl.
*H04J 3/08* (2006.01)
*H04L 12/741* (2013.01)
(Continued)

(52) U.S. Cl.
CPC ........ *H04L 45/74* (2013.01); *H04B 7/15* (2013.01); *H04L 12/66* (2013.01); *H04L 65/1006* (2013.01); *H04L 65/608* (2013.01); *H04W 76/021* (2013.01); *H04W 76/041* (2013.01)

(58) Field of Classification Search
None
See application file for complete search history.

(56) References Cited

U.S. PATENT DOCUMENTS 4,916,491 A  4/1990  Katoh
4,992,971 A  2/1991  Hayashi
(Continued)

FOREIGN PATENT DOCUMENTS

BR  PI 0718312-7 A2  11/2013
BR  PI 0719682-2 A2  1/2014
(Continued)

OTHER PUBLICATIONS

F. Baker et al. "RFC 3924—Cisco Architecture for Lawful Intercept in IP Networks." Oct. 2004.
(Continued)

*Primary Examiner* — Anh-Vu Ly
*Assistant Examiner* — Abdullahi Ahmed
(74) *Attorney, Agent, or Firm* — Knobbe Martens Olson and Bear, LLP

(57) ABSTRACT

A method and apparatus providing uninterrupted transmission of IP transmissions, during endpoint changes is disclosed. If a destination identifier in a received IP transmission matches a caller identifier of a record and a source address identifier or source identifier in the transmission do not match a caller address identifier or the caller identifier of the record, and a session identifier in the transmission matches a caller session identifier in the record, the source address identifier and the source identifier in the transmission are set as the caller address identifier and caller identifier respectively of the record. A similar procedure is followed to set the callee address identifier and callee identifier of the record using similar fields associated with the callee.

35 Claims, 6 Drawing Sheets

(51) Int. Cl.
  *H04B 7/15*   (2006.01)
  *H04L 12/66*  (2006.01)
  *H04W 76/02*  (2009.01)
  *H04L 29/06*  (2006.01)
  *H04W 76/04*  (2009.01)

(56) References Cited

U.S. PATENT DOCUMENTS

| | | |
|---|---|---|
| 5,146,491 A | 9/1992 | Silver et al. |
| 5,247,571 A | 9/1993 | Kay et al. |
| 5,303,297 A | 4/1994 | Hillis |
| 5,325,421 A | 6/1994 | Hou et al. |
| 5,359,642 A | 10/1994 | Castro |
| 5,425,085 A | 6/1995 | Weinberger et al. |
| 5,440,621 A | 8/1995 | Castro |
| 5,454,030 A | 9/1995 | de Oliveira et al. |
| 5,469,497 A | 11/1995 | Pierce et al. |
| 5,506,893 A | 4/1996 | Buscher et al. |
| 5,519,769 A | 5/1996 | Weinberger et al. |
| 5,559,871 A | 9/1996 | Smith |
| 5,590,133 A | 12/1996 | Billstrom et al. |
| 5,608,786 A | 3/1997 | Gordon |
| 5,621,787 A | 4/1997 | McKoy et al. |
| 5,633,913 A | 5/1997 | Talarmo |
| 5,661,790 A | 8/1997 | Hsu |
| 5,677,955 A | 10/1997 | Doggett et al. |
| 5,712,907 A | 1/1998 | Wegner et al. |
| 5,719,926 A | 2/1998 | Hill |
| 5,722,067 A | 2/1998 | Fougnies et al. |
| 5,724,355 A | 3/1998 | Bruno et al. |
| 5,726,984 A | 3/1998 | Kubler et al. |
| 5,737,414 A | 4/1998 | Walker et al. |
| 5,751,961 A | 5/1998 | Smyk |
| 5,793,762 A | 8/1998 | Penners et al. |
| 5,799,072 A | 8/1998 | Vulcan et al. |
| 5,802,502 A | 9/1998 | Gell et al. |
| 5,825,863 A | 10/1998 | Walker |
| 5,828,740 A | 10/1998 | Khuc et al. |
| 5,838,682 A | 11/1998 | Dekelbaum et al. |
| 5,845,267 A | 12/1998 | Ronen |
| 5,850,433 A | 12/1998 | Rondeau |
| 5,864,610 A | 1/1999 | Ronen |
| 5,867,495 A | 2/1999 | Elliott et al. |
| 5,883,810 A | 3/1999 | Franklin et al. |
| 5,883,891 A | 3/1999 | Williams et al. |
| 5,889,774 A | 3/1999 | Mirashrafi et al. |
| 5,905,736 A | 5/1999 | Ronen et al. |
| 5,907,547 A | 5/1999 | Foladare et al. |
| 5,910,946 A | 6/1999 | Csapo |
| 5,915,005 A | 6/1999 | He |
| 5,915,093 A | 6/1999 | Berlin et al. |
| 5,917,899 A | 6/1999 | Moss et al. |
| 5,923,659 A | 7/1999 | Curry et al. |
| 5,930,343 A | 7/1999 | Vasquez |
| 5,937,045 A | 8/1999 | Yaoya et al. |
| 5,940,598 A | 8/1999 | Strauss et al. |
| 5,953,504 A | 9/1999 | Sokal et al. |
| 5,956,391 A | 9/1999 | Melen et al. |
| 5,970,477 A | 10/1999 | Roden |
| 5,974,043 A | 10/1999 | Solomon |
| 5,991,291 A | 11/1999 | Asai et al. |
| 6,005,870 A | 12/1999 | Leung et al. |
| 6,005,926 A | 12/1999 | Mashinsky |
| 6,014,379 A | 1/2000 | White et al. |
| 6,021,126 A | 2/2000 | White et al. |
| 6,029,062 A | 2/2000 | Hanson |
| 6,052,445 A | 4/2000 | Bashoura et al. |
| 6,058,300 A | 5/2000 | Hanson |
| 6,069,890 A | 5/2000 | White et al. |
| 6,073,013 A | 6/2000 | Agre et al. |
| 6,078,647 A | 6/2000 | D'Eletto |
| 6,104,704 A | 8/2000 | Buhler et al. |
| 6,104,711 A | 8/2000 | Voit |
| 6,115,737 A | 9/2000 | Ely et al. |
| 6,128,304 A | 10/2000 | Gardell et al. |
| 6,137,869 A | 10/2000 | Voit et al. |
| 6,141,404 A | 10/2000 | Westerlage et al. |
| 6,151,385 A | 11/2000 | Reich et al. |
| 6,173,272 B1 | 1/2001 | Thomas et al. |
| 6,188,752 B1 | 2/2001 | Lesley |
| 6,243,689 B1 | 6/2001 | Norton |
| 6,249,573 B1 | 6/2001 | Hudson |
| 6,282,574 B1 | 8/2001 | Voit |
| 6,298,062 B1 | 10/2001 | Gardell et al. |
| 6,327,351 B1 | 12/2001 | Walker et al. |
| 6,351,464 B1 | 2/2002 | Galvin et al. |
| 6,359,880 B1 | 3/2002 | Curry et al. |
| 6,430,275 B1 | 8/2002 | Voit et al. |
| 6,445,694 B1 | 9/2002 | Swartz |
| 6,507,644 B1 | 1/2003 | Henderson et al. |
| 6,553,025 B1 | 4/2003 | Kung et al. |
| 6,560,224 B1 | 5/2003 | Kung et al. |
| 6,574,328 B1 | 6/2003 | Wood et al. |
| 6,597,686 B1 | 7/2003 | Smyk |
| 6,597,783 B1 | 7/2003 | Tada et al. |
| 6,636,833 B1 | 10/2003 | Flitcroft et al. |
| 6,650,641 B1 | 11/2003 | Albert et al. |
| 6,674,745 B1 | 1/2004 | Schuster et al. |
| 6,724,860 B2 | 4/2004 | Stumer et al. |
| 6,744,858 B1 | 6/2004 | Ryan et al. |
| 6,766,159 B2 | 7/2004 | Lindholm |
| 6,772,188 B1 | 8/2004 | Cloutier |
| 6,775,534 B2 | 8/2004 | Lindgren et al. |
| 6,785,266 B2 | 8/2004 | Swartz |
| 6,798,767 B1 | 9/2004 | Alexander et al. |
| 6,819,929 B2 | 11/2004 | Antonucci et al. |
| 6,873,599 B1 | 3/2005 | Han |
| 6,892,184 B1 | 5/2005 | Komem et al. |
| 6,934,279 B1 | 8/2005 | Sollee et al. |
| 6,937,713 B1 | 8/2005 | Kung et al. |
| 6,954,453 B1 | 10/2005 | Schindler |
| 6,963,557 B2 | 11/2005 | Knox |
| 6,963,739 B2 | 11/2005 | Dorenbosch et al. |
| 6,985,440 B1 | 1/2006 | Albert et al. |
| 6,993,015 B2 | 1/2006 | Kobayashi |
| 7,006,508 B2 | 2/2006 | Bondy et al. |
| 7,010,727 B1 | 3/2006 | Stucker |
| 7,027,564 B2 | 4/2006 | James |
| 7,046,658 B2 | 5/2006 | Kundaje |
| 7,051,072 B2 | 5/2006 | Stewart et al. |
| 7,055,174 B1 | 5/2006 | Cope et al. |
| 7,068,668 B2 | 6/2006 | Feuer |
| 7,068,772 B2 | 6/2006 | Widger et al. |
| 7,079,526 B1 | 7/2006 | Wipliez et al. |
| 7,120,682 B1 | 10/2006 | Salama |
| 7,151,772 B1 | 12/2006 | Kalmanek, Jr. et al. |
| 7,177,399 B2 | 2/2007 | Dawson et al. |
| 7,203,478 B2 | 4/2007 | Benco et al. |
| 7,212,522 B1 | 5/2007 | Shankar et al. |
| 7,277,528 B2 | 10/2007 | Rao et al. |
| 7,330,835 B2 | 2/2008 | Deggendorf |
| 7,400,881 B2 | 7/2008 | Kallio |
| 7,426,492 B1 | 9/2008 | Bishop et al. |
| 7,436,835 B2 | 10/2008 | Castleberry et al. |
| 7,437,665 B2 | 10/2008 | Perham |
| 7,440,442 B2 | 10/2008 | Grabelsky et al. |
| 7,447,707 B2 | 11/2008 | Gaurav et al. |
| 7,454,200 B2 | 11/2008 | Cai et al. |
| 7,454,510 B2 | 11/2008 | Kleyman et al. |
| 7,486,664 B2 | 2/2009 | Swartz |
| 7,486,667 B2 | 2/2009 | Feuer |
| 7,512,117 B2 | 3/2009 | Swartz |
| 7,565,131 B2 | 7/2009 | Rollender et al. |
| 7,573,982 B2 | 8/2009 | Breen et al. |
| 7,580,886 B1 | 8/2009 | Schulz |
| 7,587,036 B2 | 9/2009 | Wood et al. |
| 7,593,390 B2 | 9/2009 | Lebizay |
| 7,593,884 B2 | 9/2009 | Rothman et al. |
| 7,599,944 B2 | 10/2009 | Gaurav et al. |
| 7,639,792 B2 | 12/2009 | Qiu et al. |
| 7,644,037 B1 | 1/2010 | Ostrovsky |
| 7,647,500 B2 | 1/2010 | Machiraju et al. |
| 7,657,011 B1 | 2/2010 | Zielinski et al. |
| 7,664,495 B1 | 2/2010 | Bonner et al. |

(56) References Cited

U.S. PATENT DOCUMENTS

| | | |
|---|---|---|
| 7,676,215 B2 | 3/2010 | Chin et al. |
| 7,676,431 B2 | 3/2010 | O'Leary et al. |
| 7,680,114 B2 | 3/2010 | Yazaki et al. |
| 7,680,737 B2 | 3/2010 | Smith et al. |
| 7,702,308 B2 | 4/2010 | Rollender |
| 7,715,821 B2 | 5/2010 | Rollender |
| 7,734,544 B2 | 6/2010 | Schleicher |
| 7,738,384 B2 | 6/2010 | Pelletier |
| 7,764,777 B2 | 7/2010 | Wood et al. |
| 7,764,944 B2 | 7/2010 | Rollender |
| 7,765,261 B2 | 7/2010 | Kropivny |
| 7,765,266 B2 | 7/2010 | Kropivny |
| 7,797,459 B1 | 9/2010 | Roy et al. |
| 7,882,011 B2 | 2/2011 | Sandhu et al. |
| 7,894,441 B2 | 2/2011 | Yazaki et al. |
| 7,899,742 B2 | 3/2011 | Berkert et al. |
| 7,907,551 B2 | 3/2011 | Croy et al. |
| 7,929,955 B1 | 4/2011 | Bonner |
| 7,944,909 B2 | 5/2011 | James |
| 7,950,046 B2 | 5/2011 | Kropivny |
| 7,958,233 B2 | 6/2011 | Fernández Gutierrez |
| 7,965,645 B2 | 6/2011 | Pelletier |
| 7,979,529 B2 | 7/2011 | Kreusch et al. |
| 7,995,589 B2 | 8/2011 | Sollee et al. |
| 8,024,785 B2 | 9/2011 | Andress et al. |
| 8,027,333 B2 | 9/2011 | Grabelsky et al. |
| 8,041,022 B1 | 10/2011 | Andreasen et al. |
| 8,050,273 B2 | 11/2011 | Gass |
| 8,060,887 B2 | 11/2011 | Kropivny |
| 8,078,164 B2 | 12/2011 | Ganesan |
| 8,111,690 B2 | 2/2012 | Hussain et al. |
| 8,116,307 B1 | 2/2012 | Thesayi et al. |
| 8,125,982 B2 | 2/2012 | Feuer |
| 8,127,005 B2 | 2/2012 | Fernández Gutierrez |
| 8,145,182 B2 | 3/2012 | Rudolf et al. |
| 8,161,078 B2 | 4/2012 | Gaurav et al. |
| 8,166,533 B2 | 4/2012 | Yuan |
| 8,166,547 B2 | 4/2012 | Bevan et al. |
| 8,189,568 B2 | 5/2012 | Qiu et al. |
| 8,190,739 B2 | 5/2012 | Fernández Gutierrez |
| 8,200,575 B2 | 6/2012 | Torres et al. |
| 8,204,044 B2 | 6/2012 | Lebizay |
| 8,219,115 B1 | 7/2012 | Nelissen |
| 8,223,927 B2 | 7/2012 | Di Serio et al. |
| 8,228,837 B2 | 7/2012 | Sheriff et al. |
| 8,228,897 B2 | 7/2012 | Mitchell |
| 8,243,730 B1 | 8/2012 | Wong et al. |
| 8,244,204 B1 | 8/2012 | Chen et al. |
| 8,275,404 B2 | 9/2012 | Berger et al. |
| 8,300,632 B2 | 10/2012 | Davis et al. |
| 8,306,063 B2 | 11/2012 | Erdal et al. |
| 8,315,521 B2 | 11/2012 | Leiden et al. |
| 8,363,647 B2 | 1/2013 | Fangman et al. |
| 8,364,172 B2 | 1/2013 | Guanfeng et al. |
| 8,396,445 B2 | 3/2013 | Crawford et al. |
| 8,410,907 B2 | 4/2013 | Twitchell, Jr. |
| 8,417,791 B1 | 4/2013 | Peretz et al. |
| 8,422,507 B2 | 4/2013 | Björsell et al. |
| 8,423,791 B1 | 4/2013 | Yu et al. |
| 8,427,981 B2 | 4/2013 | Wyss et al. |
| 8,437,340 B2 | 5/2013 | James |
| 8,462,915 B2 | 6/2013 | Breen et al. |
| 8,468,196 B1 | 6/2013 | Roskind et al. |
| 8,493,931 B1 | 7/2013 | Nix |
| 8,509,225 B2 | 8/2013 | Grabelsky et al. |
| 8,526,306 B2 | 9/2013 | Jungck et al. |
| 8,532,075 B2 | 9/2013 | Rassool et al. |
| 8,537,805 B2 | 9/2013 | Björsell et al. |
| 8,542,815 B2 | 9/2013 | Perreault et al. |
| 8,543,477 B2 | 9/2013 | Love et al. |
| 8,599,747 B1 | 12/2013 | Saleem et al. |
| 8,599,837 B2 | 12/2013 | Kyle |
| 8,605,714 B2 | 12/2013 | Lebizay |
| 8,605,869 B1 | 12/2013 | Mobarak et al. |
| 8,607,323 B2 | 12/2013 | Yuan |
| 8,611,354 B2 | 12/2013 | Keränen et al. |
| 8,625,578 B2 | 1/2014 | Roy et al. |
| 8,627,211 B2 | 1/2014 | Kropivny |
| 8,630,234 B2 | 1/2014 | Björsell et al. |
| 8,634,838 B2 | 1/2014 | Hellwig et al. |
| 8,675,566 B2 | 3/2014 | Huttunen et al. |
| 8,682,919 B1 | 3/2014 | Golliher |
| 8,702,505 B2 | 4/2014 | Kropivny |
| 8,713,098 B1 | 4/2014 | Adya et al. |
| 8,724,643 B2 | 5/2014 | Feuer |
| 8,749,610 B1 | 6/2014 | Gossweiler et al. |
| 8,750,290 B2 | 6/2014 | Vance et al. |
| 8,763,081 B2 | 6/2014 | Bogdanovic et al. |
| 8,767,717 B2 | 7/2014 | Siegel et al. |
| 8,768,951 B2 | 7/2014 | Crago |
| 8,774,171 B2 | 7/2014 | Mitchell |
| 8,774,378 B2 | 7/2014 | Björsell et al. |
| 8,774,721 B2 | 7/2014 | Hertel et al. |
| 8,780,703 B1 | 7/2014 | Eidelson et al. |
| 8,792,374 B1 | 7/2014 | Jain et al. |
| 8,792,905 B1 | 7/2014 | Li et al. |
| 8,804,705 B2 | 8/2014 | Fangman et al. |
| 8,805,345 B2 | 8/2014 | Ling et al. |
| 8,810,392 B1 | 8/2014 | Teller et al. |
| 8,819,566 B2 | 8/2014 | Mehin et al. |
| 8,837,360 B1 | 9/2014 | Mishra et al. |
| 8,838,539 B1 | 9/2014 | Ashcraft et al. |
| 8,848,887 B2 | 9/2014 | Willman et al. |
| 8,862,701 B2 | 10/2014 | Havriluk |
| 8,885,609 B2 | 11/2014 | Nix |
| 8,903,051 B2 | 12/2014 | Li et al. |
| 8,903,360 B2 | 12/2014 | Celi, Jr. et al. |
| 8,909,556 B2 | 12/2014 | Huxham |
| 8,938,209 B2 | 1/2015 | Crawford et al. |
| 8,938,534 B2 | 1/2015 | Le et al. |
| 8,948,061 B2 | 2/2015 | Sridhar |
| 8,972,612 B2 | 3/2015 | Le et al. |
| 8,982,719 B2 | 3/2015 | Seetharaman et al. |
| 8,995,428 B2 | 3/2015 | Haster |
| 9,003,306 B2 | 4/2015 | Mehin et al. |
| 2001/0027478 A1 | 10/2001 | Meier et al. |
| 2001/0052081 A1 | 12/2001 | McKibben et al. |
| 2002/0002041 A1 | 1/2002 | Lindgren et al. |
| 2002/0018445 A1 | 2/2002 | Kobayashi |
| 2002/0051518 A1 | 5/2002 | Bondy et al. |
| 2002/0116464 A1 | 8/2002 | Mak |
| 2002/0122391 A1 | 9/2002 | Shalit |
| 2002/0141352 A1 | 10/2002 | Fangman et al. |
| 2003/0012196 A1 | 1/2003 | Ramakrishnan |
| 2003/0095539 A1 | 5/2003 | Feuer |
| 2003/0179747 A1 | 9/2003 | Pyke et al. |
| 2003/0200311 A1 | 10/2003 | Baum |
| 2003/0219103 A1 | 11/2003 | Rao et al. |
| 2004/0022237 A1 | 2/2004 | Elliott et al. |
| 2004/0034793 A1 | 2/2004 | Yuan |
| 2004/0157629 A1 | 8/2004 | Kallio et al. |
| 2004/0165709 A1 | 8/2004 | Pence et al. |
| 2004/0181599 A1 | 9/2004 | Kreusch et al. |
| 2004/0202295 A1 | 10/2004 | Shen et al. |
| 2004/0203565 A1 | 10/2004 | Chin et al. |
| 2004/0203582 A1 | 10/2004 | Dorenbosch et al. |
| 2004/0240439 A1 | 12/2004 | Castleberry et al. |
| 2004/0255126 A1 | 12/2004 | Reith |
| 2005/0025043 A1 | 2/2005 | Mussman et al. |
| 2005/0063519 A1 | 3/2005 | James |
| 2005/0083911 A1 | 4/2005 | Grabelsky et al. |
| 2005/0094651 A1 | 5/2005 | Lutz et al. |
| 2005/0131813 A1 | 6/2005 | Gallagher et al. |
| 2005/0169248 A1 | 8/2005 | Truesdale et al. |
| 2005/0171898 A1 | 8/2005 | Bishop et al. |
| 2005/0174937 A1 | 8/2005 | Scoggins et al. |
| 2005/0177843 A1 | 8/2005 | Williams |
| 2005/0188081 A1 | 8/2005 | Gibson et al. |
| 2005/0190892 A1 | 9/2005 | Dawson et al. |
| 2005/0192897 A1 | 9/2005 | Rogers et al. |
| 2005/0192901 A1 | 9/2005 | McCoy et al. |
| 2005/0198499 A1 | 9/2005 | Salapaka et al. |
| 2005/0202799 A1 | 9/2005 | Rollender |
| 2005/0222952 A1 | 10/2005 | Garrett et al. |

(56) References Cited

U.S. PATENT DOCUMENTS

| | | |
|---|---|---|
| 2005/0267842 A1 | 12/2005 | Weichert et al. |
| 2005/0287979 A1 | 12/2005 | Rollender |
| 2006/0006224 A1 | 1/2006 | Modi |
| 2006/0007940 A1 | 1/2006 | Sollee et al. |
| 2006/0013266 A1* | 1/2006 | Vega-Garcia et al. ........ 370/535 |
| 2006/0030290 A1 | 2/2006 | Rudolf et al. |
| 2006/0036522 A1 | 2/2006 | Perham |
| 2006/0072547 A1 | 4/2006 | Florkey et al. |
| 2006/0072550 A1 | 4/2006 | Davis et al. |
| 2006/0078094 A1 | 4/2006 | Breen et al. |
| 2006/0093135 A1 | 5/2006 | Fiatal et al. |
| 2006/0095320 A1 | 5/2006 | Jones |
| 2006/0111116 A1 | 5/2006 | Palmer et al. |
| 2006/0116892 A1 | 6/2006 | Grimes et al. |
| 2006/0142011 A1 | 6/2006 | Kallio |
| 2006/0146797 A1 | 7/2006 | Lebizay |
| 2006/0153342 A1 | 7/2006 | Sasaki |
| 2006/0160565 A1 | 7/2006 | Singh et al. |
| 2006/0177035 A1 | 8/2006 | Cope et al. |
| 2006/0189303 A1 | 8/2006 | Rollender |
| 2006/0195398 A1 | 8/2006 | Dheer et al. |
| 2006/0205383 A1 | 9/2006 | Rollender et al. |
| 2006/0209768 A1 | 9/2006 | Yan et al. |
| 2006/0248186 A1 | 11/2006 | Smith |
| 2006/0251056 A1 | 11/2006 | Feuer |
| 2006/0258328 A1 | 11/2006 | Godoy |
| 2006/0264200 A1 | 11/2006 | Laiho et al. |
| 2006/0268921 A1 | 11/2006 | Ekstrom et al. |
| 2006/0281437 A1 | 12/2006 | Cook |
| 2007/0016524 A1 | 1/2007 | Diveley et al. |
| 2007/0036143 A1 | 2/2007 | Alt et al. |
| 2007/0047548 A1 | 3/2007 | Yazaki et al. |
| 2007/0053382 A1 | 3/2007 | Bevan et al. |
| 2007/0092070 A1 | 4/2007 | Croy et al. |
| 2007/0112964 A1 | 5/2007 | Guedalia et al. |
| 2007/0115935 A1 | 5/2007 | Qiu et al. |
| 2007/0121593 A1 | 5/2007 | Vance et al. |
| 2007/0127676 A1 | 6/2007 | Khadri |
| 2007/0174469 A1 | 7/2007 | Andress et al. |
| 2007/0217354 A1 | 9/2007 | Buckley |
| 2007/0220038 A1 | 9/2007 | Crago |
| 2007/0253418 A1 | 11/2007 | Shiri et al. |
| 2007/0253429 A1 | 11/2007 | James |
| 2007/0263609 A1 | 11/2007 | Mitchell |
| 2007/0297376 A1 | 12/2007 | Gass |
| 2008/0013523 A1 | 1/2008 | Nambakkam |
| 2008/0037715 A1 | 2/2008 | Prozeniuk et al. |
| 2008/0056235 A1 | 3/2008 | Albina et al. |
| 2008/0056243 A1 | 3/2008 | Roy et al. |
| 2008/0056302 A1* | 3/2008 | Erdal et al. ................... 370/474 |
| 2008/0063153 A1 | 3/2008 | Krivorot et al. |
| 2008/0166999 A1 | 7/2008 | Guedalia et al. |
| 2008/0167019 A1 | 7/2008 | Guedalia et al. |
| 2008/0167020 A1 | 7/2008 | Guedalia et al. |
| 2008/0167039 A1 | 7/2008 | Guedalia et al. |
| 2008/0187122 A1 | 8/2008 | Baker |
| 2008/0188198 A1 | 8/2008 | Patel et al. |
| 2008/0188227 A1 | 8/2008 | Guedalia et al. |
| 2008/0205378 A1 | 8/2008 | Wyss et al. |
| 2008/0310599 A1 | 12/2008 | Purnadi et al. |
| 2009/0003535 A1 | 1/2009 | Grabelsky et al. |
| 2009/0028146 A1 | 1/2009 | Kleyman et al. |
| 2009/0129566 A1 | 5/2009 | Feuer |
| 2009/0135724 A1* | 5/2009 | Zhang et al. .................. 370/241 |
| 2009/0135735 A1* | 5/2009 | Zhang et al. .................. 370/253 |
| 2009/0141883 A1* | 6/2009 | Bastien .................... 379/213.01 |
| 2009/0213839 A1 | 8/2009 | Davis et al. |
| 2009/0214000 A1 | 8/2009 | Patel et al. |
| 2009/0268615 A1 | 10/2009 | Pelletier |
| 2009/0292539 A1 | 11/2009 | Jaroker |
| 2009/0296900 A1 | 12/2009 | Breen et al. |
| 2009/0325558 A1 | 12/2009 | Pridmore et al. |
| 2010/0008345 A1 | 1/2010 | Lebizay |
| 2010/0039946 A1 | 2/2010 | Imbimbo et al. |
| 2010/0083364 A1 | 4/2010 | Fernández Gutierrez |
| 2010/0086119 A1 | 4/2010 | De Luca et al. |
| 2010/0105379 A1 | 4/2010 | Bonner et al. |
| 2010/0114896 A1 | 5/2010 | Clark et al. |
| 2010/0115018 A1 | 5/2010 | Yoon et al. |
| 2010/0128729 A1* | 5/2010 | Yazaki et al. .................. 370/392 |
| 2010/0142382 A1 | 6/2010 | Jungck et al. |
| 2010/0150138 A1 | 6/2010 | Björsell et al. |
| 2010/0150328 A1 | 6/2010 | Perreault et al. |
| 2010/0172345 A1 | 7/2010 | Björsell et al. |
| 2010/0177671 A1 | 7/2010 | Qiu et al. |
| 2010/0220852 A1 | 9/2010 | Willman et al. |
| 2010/0233991 A1 | 9/2010 | Crawford et al. |
| 2010/0246589 A1 | 9/2010 | Pelletier |
| 2010/0272242 A1 | 10/2010 | Croy et al. |
| 2010/0278534 A1 | 11/2010 | Leiden et al. |
| 2010/0316195 A1 | 12/2010 | Di Serio et al. |
| 2011/0013541 A1 | 1/2011 | Croy et al. |
| 2011/0072095 A1 | 3/2011 | Havriluk |
| 2011/0122827 A1 | 5/2011 | Björsell et al. |
| 2011/0153809 A1 | 6/2011 | Ghanem et al. |
| 2011/0167164 A1 | 7/2011 | Fernández Gutierrez |
| 2011/0176541 A1 | 7/2011 | James |
| 2011/0201321 A1 | 8/2011 | Bonner |
| 2011/0208859 A1 | 8/2011 | Fernández Gutierrez |
| 2011/0235543 A1 | 9/2011 | Seetharaman et al. |
| 2011/0255553 A1 | 10/2011 | Bobba et al. |
| 2011/0261717 A1 | 10/2011 | Akuzuwa et al. |
| 2011/0267986 A1 | 11/2011 | Grabelsky et al. |
| 2011/0273526 A1 | 11/2011 | Mehin et al. |
| 2011/0276903 A1 | 11/2011 | Mehin et al. |
| 2011/0276904 A1 | 11/2011 | Mehin et al. |
| 2011/0292929 A1 | 12/2011 | Haster |
| 2012/0014383 A1* | 1/2012 | Geromel et al. ............... 370/352 |
| 2012/0089717 A1 | 4/2012 | Chen |
| 2012/0096145 A1 | 4/2012 | Le et al. |
| 2012/0099599 A1* | 4/2012 | Keranen et al. ................ 370/392 |
| 2012/0113981 A1 | 5/2012 | Feuer |
| 2012/0155333 A1 | 6/2012 | Yoon et al. |
| 2012/0170574 A1 | 7/2012 | Huttunen et al. |
| 2012/0195236 A1 | 8/2012 | Knight |
| 2012/0195415 A1 | 8/2012 | Wyss et al. |
| 2012/0227101 A1 | 9/2012 | Yuan |
| 2012/0250624 A1 | 10/2012 | Lebizay |
| 2012/0259975 A1 | 10/2012 | Le et al. |
| 2012/0270554 A1 | 10/2012 | Hellwig et al. |
| 2012/0282881 A1 | 11/2012 | Mitchell |
| 2012/0314699 A1 | 12/2012 | Qiu et al. |
| 2013/0039226 A1 | 2/2013 | Sridhar |
| 2013/0097308 A1 | 4/2013 | Le et al. |
| 2013/0114589 A1* | 5/2013 | Fangman et al. ............. 370/352 |
| 2013/0128879 A1 | 5/2013 | Kyle |
| 2013/0148549 A1 | 6/2013 | Crawford et al. |
| 2013/0173534 A1 | 7/2013 | Nelakonda et al. |
| 2013/0223276 A1 | 8/2013 | Padgett |
| 2013/0229950 A1 | 9/2013 | Björsell et al. |
| 2013/0237198 A1 | 9/2013 | Vashi et al. |
| 2013/0254301 A1 | 9/2013 | Lin et al. |
| 2013/0272297 A1 | 10/2013 | Breen et al. |
| 2013/0281147 A1 | 10/2013 | Denman et al. |
| 2013/0287006 A1 | 10/2013 | Nix |
| 2013/0310002 A1 | 11/2013 | Celi, Jr. et al. |
| 2013/0318166 A1 | 11/2013 | Jungck et al. |
| 2013/0329722 A1 | 12/2013 | Perrault et al. |
| 2013/0329864 A1 | 12/2013 | Björsell et al. |
| 2014/0010119 A1 | 1/2014 | Björsell et al. |
| 2014/0016764 A1 | 1/2014 | Björsell et al. |
| 2014/0024367 A1 | 1/2014 | Björsell et al. |
| 2014/0101749 A1 | 4/2014 | Yuan |
| 2014/0141884 A1 | 5/2014 | Kropivny |
| 2014/0211789 A1 | 7/2014 | Feuer |
| 2014/0215642 A1 | 7/2014 | Huxham |
| 2014/0220944 A1 | 8/2014 | Balasubramanian |
| 2014/0244393 A1 | 8/2014 | Rimmer et al. |
| 2014/0247730 A1 | 9/2014 | Thota et al. |
| 2014/0269624 A1 | 9/2014 | Khay-Ibbat et al. |
| 2014/0307858 A1 | 10/2014 | Li et al. |
| 2014/0321333 A1 | 10/2014 | Björsell et al. |
| 2014/0324969 A1 | 10/2014 | Riddle |

(56) References Cited

U.S. PATENT DOCUMENTS

| | | | |
|---|---|---|---|
| 2014/0337961 A1 | 11/2014 | Chien et al. | |
| 2014/0337962 A1 | 11/2014 | Brandstatter | |
| 2014/0349602 A1 | 11/2014 | Majumdar et al. | |

FOREIGN PATENT DOCUMENTS

| | | |
|---|---|---|
| CA | 2 218 218 A1 | 10/1997 |
| CA | 2249668 | 4/1999 |
| CA | 2 299 037 A1 | 8/2000 |
| CA | 2 437 275 A1 | 10/2002 |
| CA | 2598200 A1 | 2/2008 |
| CA | 2668025 A1 | 5/2008 |
| CA | 2670510 A1 | 6/2008 |
| CA | 2681984 A1 | 10/2008 |
| CA | 2 690 236 A1 | 12/2008 |
| CA | 2 659 007 A1 | 9/2009 |
| CA | 2732148 | 2/2010 |
| CA | 2 778 905 A1 | 8/2010 |
| CA | 2812174 A1 | 3/2011 |
| CN | 1498029 A | 5/2004 |
| CN | 1498482 A | 5/2004 |
| CN | 1668137 A | 9/2005 |
| CN | 1274114 C | 9/2006 |
| CN | 101005503 A | 7/2007 |
| CN | 101069390 A | 11/2007 |
| CN | 101095329 A | 12/2007 |
| CN | 101584150 A | 11/2009 |
| CN | 101584166 A | 11/2009 |
| CN | 101605342 A | 12/2009 |
| CN | 1498029 B | 5/2010 |
| CN | 101772929 A | 7/2010 |
| CN | 101069390 B | 12/2010 |
| CN | 102137024 A | 7/2011 |
| CN | 102457494 A | 5/2012 |
| CN | 102484656 A | 5/2012 |
| CN | 102572123 A | 7/2012 |
| CN | 101095329 B | 10/2012 |
| CN | 101605342 B | 12/2012 |
| CN | 102833232 A | 12/2012 |
| CN | 101005503 B | 1/2013 |
| CN | 101772929 B | 7/2014 |
| CN | 102457494 B | 10/2014 |
| DE | 602 01 827 T2 | 11/2005 |
| DE | 11 2005 003 306 T5 | 1/2008 |
| DE | 601 33 316 T2 | 7/2008 |
| DE | 603 17 751 T2 | 11/2008 |
| EP | 0 841 832 A2 | 5/1998 |
| EP | 0 841 832 A3 | 5/1999 |
| EP | 1 032 224 A2 | 8/2000 |
| EP | 1 032 224 A3 | 8/2000 |
| EP | 1 244 250 A1 | 9/2002 |
| EP | 1 266 516 A2 | 12/2002 |
| EP | 1 362 456 A2 | 11/2003 |
| EP | 1 371 173 A1 | 12/2003 |
| EP | 1 389 862 A1 | 2/2004 |
| EP | 1 411 743 A1 | 4/2004 |
| EP | 1 389 862 B1 | 11/2004 |
| EP | 1 526 697 A2 | 4/2005 |
| EP | 1 362 456 A4 | 5/2005 |
| EP | 1 575 327 A1 | 9/2005 |
| EP | 1 610 583 A1 | 12/2005 |
| EP | 1 526 697 A3 | 3/2006 |
| EP | 1 721 446 A1 | 11/2006 |
| EP | 1 829 300 A1 | 9/2007 |
| EP | 1 371 173 B1 | 11/2007 |
| EP | 1 411 743 B1 | 11/2007 |
| EP | 1 362 456 B1 | 3/2008 |
| EP | 1 974 304 A2 | 10/2008 |
| EP | 1 974 304 A4 | 10/2008 |
| EP | 1 610 583 B1 | 8/2009 |
| EP | 2 084 868 A0 | 8/2009 |
| EP | 2 090 024 | 8/2009 |
| EP | 2 127 232 A1 | 12/2009 |
| EP | 2 165 489 A1 | 3/2010 |
| EP | 2 215 755 A1 | 8/2010 |
| EP | 2 227 048 A1 | 9/2010 |
| EP | 2 127 232 A4 | 3/2011 |
| EP | 2 165 489 A4 | 3/2011 |
| EP | 2 311 292 A0 | 4/2011 |
| EP | 1 829 300 A4 | 5/2012 |
| EP | 2 449 749 A1 | 5/2012 |
| EP | 2 478 678 A0 | 7/2012 |
| EP | 2 215 755 A4 | 10/2012 |
| EP | 1 829 300 B1 | 11/2012 |
| EP | 2 449 749 B1 | 3/2014 |
| EP | 1 266 516 B1 | 5/2014 |
| ID | W00200902627 | 9/2009 |
| IN | 24/2009 | 6/2009 |
| IN | 29/2009 | 7/2009 |
| JP | 2011-199384 A | 10/2011 |
| KR | 10-2009-0086428 (A) | 8/2009 |
| KR | 10-2009-0095621 (A) | 9/2009 |
| MX | 2009004811 A | 8/2009 |
| MX | 2009005751 A | 8/2009 |
| SG | 151991 | 6/2009 |
| SG | 152752 | 6/2009 |
| SG | 155474 | 10/2009 |
| WO | WO 01/50693 A1 | 7/2001 |
| WO | WO 01/69899 A2 | 9/2001 |
| WO | WO 01/69899 A3 | 9/2001 |
| WO | WO 01/80587 A1 | 10/2001 |
| WO | WO 01/89145 A2 | 11/2001 |
| WO | WO 02/082728 A1 | 10/2002 |
| WO | WO 02/082782 A2 | 10/2002 |
| WO | WO 02/082782 A3 | 10/2002 |
| WO | WO 03/027801 A2 | 4/2003 |
| WO | WO 2005/084002 A1 | 9/2005 |
| WO | WO 2006/067269 A1 | 6/2006 |
| WO | WO 2006/072099 A1 | 7/2006 |
| WO | WO 2006/078175 A2 | 7/2006 |
| WO | WO 2006/078175 A3 | 7/2006 |
| WO | WO 2007/044454 A2 | 4/2007 |
| WO | WO 2007/056158 A2 | 5/2007 |
| WO | WO 2007/087077 A2 | 8/2007 |
| WO | WO 2007/087077 A3 | 8/2007 |
| WO | WO 2008/027065 A1 | 3/2008 |
| WO | WO 2008/052340 A1 | 5/2008 |
| WO | WO 2008/064481 A1 | 6/2008 |
| WO | WO 2008/085614 A2 | 7/2008 |
| WO | WO 2008/085614 A3 | 7/2008 |
| WO | WO 2008/086350 A2 | 7/2008 |
| WO | WO 2008/086350 A3 | 7/2008 |
| WO | WO 2008/103652 A1 | 8/2008 |
| WO | WO 2008/116296 A1 | 10/2008 |
| WO | WO 2008/085614 A8 | 12/2008 |
| WO | WO 2008/151406 A1 | 12/2008 |
| WO | WO 2008/151406 A8 | 12/2008 |
| WO | WO 2009/070202 A1 | 6/2009 |
| WO | WO 2009/070278 A1 | 6/2009 |
| WO | WO 2010/012090 A2 | 2/2010 |
| WO | WO 2011/000405 A1 | 1/2011 |
| WO | WO 2011/032256 A1 | 3/2011 |
| WO | WO 2013/013189 A2 | 1/2013 |
| WO | WO 2013/120069 A1 | 8/2013 |
| WO | WO 2014/066155 A2 | 5/2014 |
| WO | WO 2014/117599 A1 | 8/2014 |
| WO | WO 2014/166258 A1 | 10/2014 |

OTHER PUBLICATIONS

Cisco. "Lawful Intercept Requirements Summary." http://www.faqs.org/rfcs/rfc3924.html. Nov. 8, 2006.
Sippy SIP B2BUA. "About Sippy RTPproxy." http://www.rtpproxy.org. Jul. 15, 2009.
ETSI Technical Specification. "Lawful Interception (LI); Handover Interface and Service-Specific Details (SSD) for IP delivery; Part 5: Service-specific details for IP Multimedia Services." Apr. 2008, 25 pgs, v.2.3.1, France.
M. Handley et al. "RFC 2543—SIP: Session Initiation Protocol." Mar. 1999.

(56) References Cited

OTHER PUBLICATIONS

The International Search Report and Written Opinion of the International Searching Authority completed Feb. 6, 2008 for International Application No. PCT/CA2007/001956.
The International Search Report and Written Opinion of the International Searching Authority completed Mar. 3, 2008 for International Application No. PCT/CA2007/002150.
The International Search Report and Written Opinion of the International Searching Authority completed Jun. 6, 2008 for International Application No. PCT/CA2008/000545.
The International Preliminary Report on Patentability completed Feb. 13, 2009 for International Application No. PCT/CA2007/002150.
The International Preliminary Report on Patentability issued May 5, 2009 for International Application No. PCT/CA2007/001956.
The International Preliminary Report on Patentability issued Sep. 29, 2009 for International Application No. PCT/CA2008/000545.
The International Search Report and Written Opinion mailed Mar. 12, 2010 for International Application No. PCT/CA2009/001062.
The Written Opinion and International Search Report mailed Jun. 18, 2010 for International Application No. /CA2009/001317.
The International Preliminary Report on Patentability and Written Opinion of the International Searching Authority issued Feb. 1, 2011 for International Application No. PCT/CA2009/001062.
The International Preliminary Report on Patentability issued Mar. 20, 2012 for International Application No. PCT/CA2009/001317.
Townsley, et al.; "RFC 2661—Layer Two Tunneling Protocol 'L2TP'", Aug. 1999.
IP2Location, http://www.ip2location.com/; printed Jun. 20, 2012.
DOTS IP Address Validation, "Overview", http://www.serviceobjects.com/products/dots_ipgeo.asp; printed Jun. 21, 2012.
List of North American Numbering Plan area codes, http://en.wikipedia.org/wiki/List_of_NANP_area_codes; printed Jun. 20, 2012.
DOTS Phone Exchange, "Overview", http://www.serviceobjects.com/demos/PhoneExchangeDemo.asp (URL no longer valid, current URL is http://www.serviceobjects.com/products/phone/phone-exchange); printed Jun. 21, 2012.
Rosenberg, et al.; "RFC 3261—SIP: Session Initiation Protocol", Jun. 2002.
Lind AT&T S: "ENUM Call Flows for VoIP Interworking; draft-lind-enum-callflows-03.txt", Feb. 1, 2002, No. 3, pp. 1-17, XP015004214, ISSN: 0000-0004.
IETF ENUM WG R Stastny OEFEG Informational Numbering for VOIP and Other IP Communications: "Numbering for ViOP and other IP Communications, draft-stastny-enum-numbering-voip-00.txt", Oct. 1, 2003, pp. 1-43, XP015035676, ISSN: 0000-0004.
Supplementary European Search Report for European Application No. 07816106, dated Jun. 18, 2012.
Supplementary European Search Report for European Application No. 07816106, dated Nov. 2, 2012.
Wikipedia, "International mobile subscriber identity (IMSI)," http://en.wikipedia.org/wiki/IMSI, Jul. 16, 2013.
Wikipedia, "Roaming," http://en.wikipedia.org/wiki/Roaming, Jul. 16, 2013.
Extended European Search Report dated Dec. 20, 2013 for European Patent Application No. EP 09 849 358.8 which shares priority of International Application No. PCT/CA2009/001317 with U.S. Appl. No. 13/496,864, which is the parent of captioned U.S. Appl. No. 14/092,831.
Extended European Search Report dated Nov. 2, 2012 for European Application No. EP 07 855 436.7.
Extended European Search Report dated Apr. 16, 2014 for European Patent Application No. EP 09 802 316.1 which shares priority of U.S. Appl. No. 61/129,898, filed Jul. 28, 2008 with U.S. Appl. No. 13/056,277, filed Jan. 27, 2011, which is related to captioned U.S. Appl. No. 14/092,831, and cites above-identified reference Nos. 1 and 2.
Baker et al., "Cisco Support for Lawful Intercept in IP Networks," Internet Draft—working document of the Internet Engineering Task Force (IETF), accessible at http://www.ietf.org/ietf/lid-abstracts.txt, Apr. 2003, expires Sep. 30, 2003, pp. 1-15.
Bhushan et al., "Federated Accounting: Service Charging and Billing in a Business-to-Business Environment," 0-7803-6719-7/01, © 2001 IEEE, pp. 107-121.
Jajszczyk et al., "Emergency Calls in Flow-Aware Networks," *IEEE Communications Letters*, vol. 11, No. 9, Sep. 2007, pp. 753-755.
Kim et al., "An Enhanced VoIP Emergency Services Prototype," *Proceedings of the 3rd International ISCRAM Conference* (B. Van de Walle and M. Turoff, eds.), Newark, NJ (USA), May 2006, pp. 1-8.
Kornfeld et al., "DVB-H and IP Datacast—Broadcast to Handheld Devices," *IEEE Transactions on Broadcasting*, vol. 53, No. 1, Mar. 2007, pp. 161-170.
Kortebi et al., "SINR-Based Routing in Multi-Hop Wireless Networks to Improve VoIP Applications Support," 1-4244-0667-6/07, © 2007 IEEE, pp. 491-496.
Lee et al., "VoIP Interoperation with KT-NGN," in *The 6th International Conference on Advanced Communication Technology*, Technical Proceedings, 2004, pp. 126-128, accompanied by Title and Contents—4 pages.
Lin et al., "Effective VoIP Call Routing in WLAN and Cellular Integration," *IEEE Communications Letters*, vol. 9, No. 10, Oct. 2005, pp. 874-876.
Ma et al., "Realizing MPEG4 Video Transmission Based on Mobile Station over GPRS," 0-7803-9335-X/05, © 2005 IEEE, pp. 1241-1244.
Mintz-Habib et al., "A VoIP Emergency Services Architecture and Prototype," {mm2571,asr,hgs,xiaotaow}@cs.columbia.edu, 0-7803-9428-3/05, © 2005 IEEE, pp. 523-528.
Munir, Muhammad Farukh, "Study of an Adaptive Scheme for Voice Transmission on IP in a Wireless Networking Environment 802.11e," *Dept. of Networks and Distributed Computing, Ecole Supérieure En Sciences Informatiques (ESSI)*, Université De Nice, Jun. 2005, (pp. 1-35), Best Available Copy—pp. 1-11.
Sripanidkulchai et al., "Call Routing Management in Enterprise VoIP Networks," *Copyright 2007 ACM* 978-1-59593-788-9/07/0008, 6 pages.
Thernelius, Fredrik, "SIP, NAT, and Firewalls," Master's Thesis, *ERICSSON, Department of Teleinformatics*, May 2000, pp. 1-69.
Trad et al., "Adaptive VoIP Transmission over Heterogeneous Wired/Wireless Networks," V. Roca and F. Rousscau (Eds.): *MIPS 2004, LNCS 3311*, pp. 25-36, 2004, © Springer-Verlag Berlin Heidelberg 2004.
Yu et al., "Service-Oriented Issues: Mobility, Security, Charging and Billing Management in Mobile Next Generation Networks," *IEEE BcN 2006*, 1-4244-0146-1/06, © 2006 IEEE, pp. 1-10.
ETSI TS 122 173 V12.7.0 (Oct. 2014) Digital cellular telecommunications system (Phase 2+); Technical Specification 8.2.2.3—Interoperability with PSTN/ISDN and mobile CS Networks, Contents and Forward, pp. 1-9; Sec. 8, pp. 14-17.
Huitema et al., "Architecture for Internet Telephony Service for Residential Customers," Academic Paper for *Bellcore*, Mar. 2, 1999, pp. 1-14.
Stallings, William, "The Session Initiation Protocol," *The Internet Protocol Journal*, vol. 6, No. 1, Mar. 2003, pp. 20-30.
Canadian Office Action dated Jan. 27, 2015 for Canadian Patent Application No. CA 2,681,984.
Chinese Office Action dated Mar. 24, 2011 for Chinese Patent Application No. CN 200780049791.5.
Chinese Office Action dated Jun. 23, 2011 for Chinese Patent Application No. 200780049136.X.
Indonesian Examination Report dated Jul. 5, 2012 for Indonesian Patent Application No. W-00200901414.
Indonesian Examination Report dated Feb. 8, 2013 for Indonesian Patent Application No. W-00200901165.
Mexican Exam Report dated Jul. 11, 2011 for Mexican Patent Application No. MX/a/2009/004811.
Mexican Notice of Allowance dated Sep. 2, 2011 for Mexican Patent Application No. MX/a/2009/005751.

(56) References Cited

OTHER PUBLICATIONS

Ketchel et al. "U-PAI: A universal payment application interface" *Second UNISEX Workshop on Electronic Commerce Proceedings*, 1996-8, pp. 1-17.

Moberg & Drummond, "MIME-Based Secure Peer-to-Peer Business Data Interchange Using HTTP, Applicability Statement 2 (AS2)," *Network Working Group, Request for Comments: 4130, Category: Standards Track*, Copyright © The Internet Society Jul. 2005, pp. 1-47.

Abrazhevich, Dennis. "Electronic Payment Systems: a User-Centered Perspective and Interaction Design," *Thesis under the auspices of the J.F. Schouten School for User-System Interaction Research*, Technische Universiteit Eindhoven, Netherlands, 2004, pp. Cover page-p. 189.

\* cited by examiner

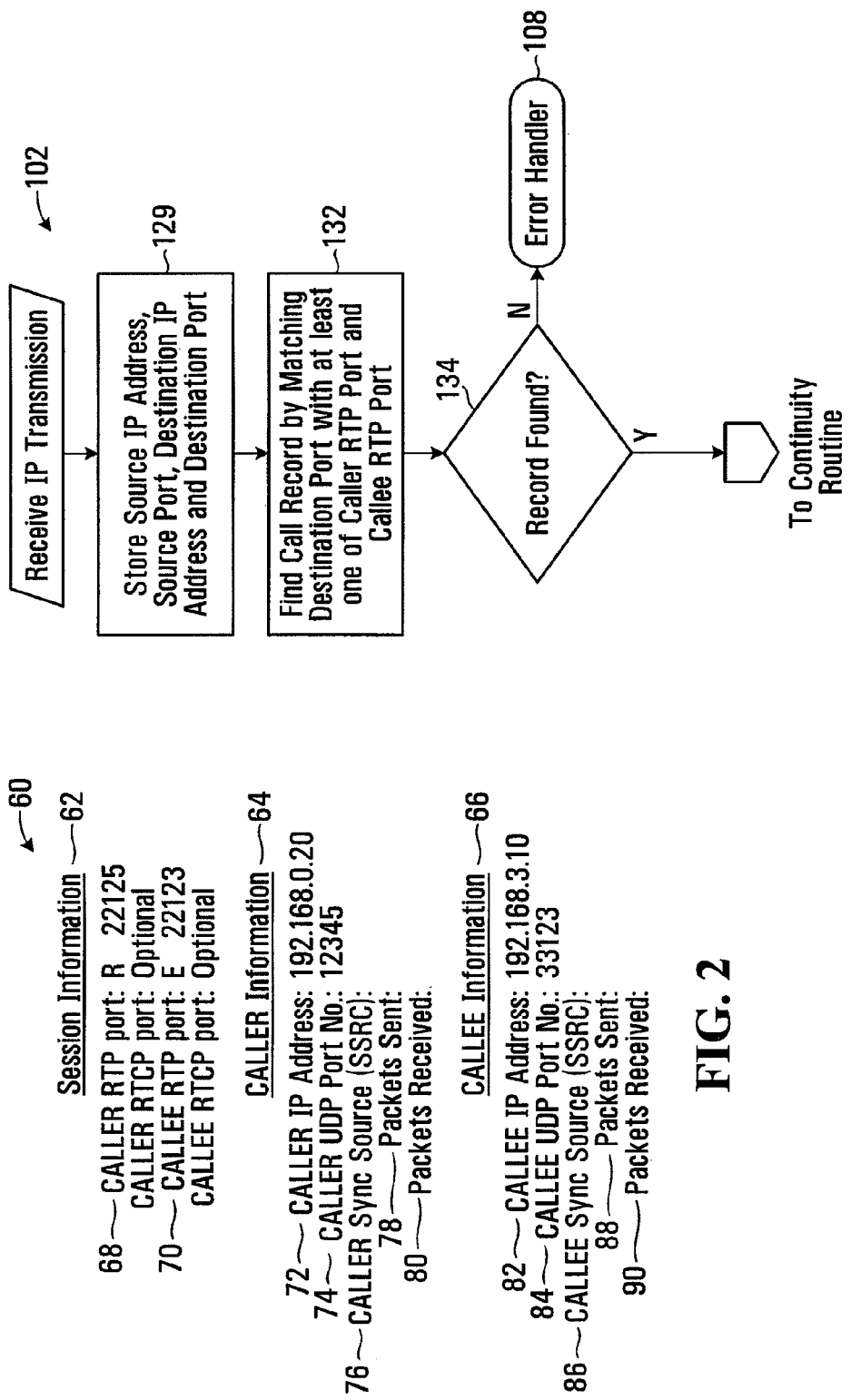

Session Information

CALLER RTP port: R   22125
CALLER RTCP port: Optional
CALLEE RTP port: E   22123
CALLEE RTCP port: Optional CALLER Information CALLER IP Address: 192.168.0.20
CALLER UDP Port No.: 12345
CALLER Sync Source (SSRC):
Packets Sent:
Packets Received: 1—136

CALLEE Information

CALLEE IP Address: 192.168.3.10
CALLEE UDP Port No.: 33123
CALLEE Sync Source (SSRC):
Packets Sent:
Packets Received:

Session Information

CALLER RTP port: R 22125
CALLER RTCP port: Optional
CALLEE RTP port: E 22123
CALLEE RTCP port: Optional

CALLER Information

CALLER IP Address: 192.168.0.20
CALLER UDP Port No.: 12345
76— CALLER Sync Source (SSRC): SSRC_R —146
Packets Sent:
Packets Received: 1

CALLEE Information

CALLEE IP Address: 192.168.3.10
CALLEE UDP Port No.: 33123
CALLEE Sync Source (SSRC):
Packets Sent:
Packets Received:

FIG. 7

Session Information

CALLER RTP port: R 22125
CALLER RTCP port: Optional
CALLEE RTP port: E 22123
CALLEE RTCP port: Optional

CALLER Information

CALLER IP Address: 192.168.0.30
CALLER UDP Port No.: 33333
CALLER Sync Source (SSRC): SSRC_R
Packets Sent:
Packets Received: 2

CALLEE Information

CALLEE IP Address: 192.168.3.10
CALLEE UDP Port No.: 33123
CALLEE Sync Source (SSRC):
Packets Sent:
Packets Received:

FIG. 8

UNINTERRUPTED TRANSMISSION OF INTERNET PROTOCOL TRANSMISSIONS DURING ENDPOINT CHANGES

CROSS-REFERENCE TO RELATED APPLICATIONS

This application is a continuation of U.S. application Ser. No. 13/496,864, filed Mar. 16, 2012, entitled "Uninterrupted Transmission of Internet Protocol Transmissions During Endpoint Changes", which is a national phase entry of PCT/CA2009/001317, filed Sep. 17, 2009, all of which are incorporated by reference in their entireties.

BACKGROUND

1. Field

This invention relates to Internet protocol (IP) transmissions and, more particularly, to uninterrupted transmission of IP transmissions containing real time transport protocol (RTP) data during endpoint changes.

2. Description of the Related Technology

Internet Protocol (IP) transmission systems are known to use media relays to relay IP transmissions from one endpoint to another. In a telephone system, the media relay relays IP transmissions between a caller and a callee. An IP session is established by a call controller, which interacts with the media relay, the caller and the callee to convey to each of these entities the IP addresses and ports to which they should send IP transmissions and from which they should expect IP transmissions. The media relay is configured to accept packets conveyed by IP transmissions from specified caller and callee IP addresses and ports. In some systems, such as mobile telephone systems, a mobile telephone may be in communication with a first base station while in a certain geographical area and there may be a handoff of the call to another base station when the mobile telephone is moved to a different geographical location. Communications between the base stations and the mobile telephones are conducted on a Global System from Mobile Communication (GSM) network or other cellular network, for example, and the base stations convert messages to and from the GSM network and the IP network and thus, the base stations establish the caller and callee IP addresses and ports. Each base station will have a unique IP address and UDP port number that it associates or assigns to the mobile telephone with which it has established communication in the conventional manner over the cellular network. Thus, a conventional media relay will reject IP streams from the new base station after handoff of the call because such streams are seen as being transmitted by an unauthorized source. This generally prevents voice over IP telephone calls from being made through systems that employ media relays without further call handling.

The Session Initiation Protocol (SIP) RFC 3261 provided by the Internet Engineering Task Force (IETF) specifies a mechanism for an endpoint to notify another endpoint if its IP address changes. This mechanism employs a signaling message that conveys an identification of new media properties for the endpoint whose IP address has changed. The use of SIP messages for this purpose, however, adds extra overhead and delays to the call as signaling messages must be routed through the call controller and the call controller must communicate with the media relay and endpoints to re-configure the media relay to accept IP transmissions from the endpoint having the new IP address and to cause IP transmission to be relayed thereto each time a handoff occurs.

SUMMARY OF CERTAIN EMBODIMENTS

In accordance with one aspect, there is provided a method for facilitating uninterrupted transmission of Internet Protocol (IP) transmissions, during endpoint changes. The method involves, in response to receiving an IP transmission at a caller port or a callee port of a media relay through which IP transmissions of an IP communication session are relayed, locating a session information record having a caller port identifier or callee port identifier matching a destination port identifier in the IP transmission. The caller port identifier identifies the caller port and the callee port identifier identifies the callee port. When the destination port identifier in the IP transmission matches the caller port identifier of the session information record and when a source IP address identifier or a source port identifier in the IP transmission do not match a caller IP address identifier or the caller port identifier respectively of the session information record, and when a session identifier in the IP transmission matches a caller session identifier in the session information record, the method involves setting the source IP address identifier and the source port identifier in the IP transmission as the caller IP address identifier and caller port identifier respectively of the session information record. When the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record, the method involves setting the source IP address identifier and the source port identifier of the IP transmission as the callee IP address identifier and the callee port identifier respectively of the session information record.

The method may involve maintaining the session information records, each record associating session information, caller information and callee information for a respective IP communication session, and the session information including the caller and callee port identifiers identifying a caller port and a callee port respectively of the media relay through which IP transmissions of the IP communication session are relayed. The caller information may include the caller IP address identifier and the caller port identifier to which IP transmissions received at the callee port are transmitted from the media relay, and a caller session identifier. The callee information may include the callee IP address identifier and the callee port identifier to which IP transmissions received at the caller port are transmitted from the media relay, and may further include a callee session identifier.

The method may involve storing the session identifier received in the IP transmission in the caller session identifier field in the session information record, when the pre-determined IP transmission is received from the caller, and storing the session identifier received in the IP transmission in the callee session identifier field in the session information record, when the pre-determined IP transmission is received from the callee.

The method may involve causing the media relay to forward the IP transmission to the callee at the callee IP address and callee port identified by the callee IP address identifier and callee port identifier respectively of the session information record and identifying the source of the IP transmission forwarded to the callee with the callee port identifier, when the IP transmission was received at the caller port.

The method may involve causing the media relay to forward the IP transmission to the caller at the caller IP address and caller port identified by the caller IP address identifier and caller port identifier respectively of the record and identifying the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data, the caller port may be a caller RTP port and the callee port may be a callee RTP port.

In accordance with another aspect, there is provided a media relay apparatus for facilitating uninterrupted transmission of Internet Protocol (IP) transmissions during endpoint changes. The apparatus includes connection provisions for providing a connection to an IP network, provisions for defining a logical input/output interface defining caller and callee ports in the connection provisions. The apparatus further includes provisions for relaying IP transmissions of an IP communication session between a caller port and a callee port of the connection provisions. The apparatus further includes provisions for receiving an IP transmission at the caller port or the callee port. The apparatus further includes provisions for locating a session information record having a caller port identifier or a callee port identifier matching a destination port identifier included in the IP transmission. The caller port identifier identifies the caller port and the callee port identifier identifies the callee port. The apparatus further includes provisions for setting a source IP address identifier and a source port identifier in the IP transmission as the caller IP address identifier and caller port identifier respectively of the session information record when the destination port identifier in the IP transmission matches the caller port identifier of the session information record, and when the source IP address identifier or the source port identifier in the IP transmission do not match a caller IP address identifier or the caller port identifier respectively of the session information record, and when a session identifier in the IP transmission matches a caller session identifier in the session information record. The apparatus further includes provisions for setting the source IP address identifier and the source port identifier of the IP transmission as the callee IP address identifier and the callee port identifier respectively of the session information record when the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record.

The apparatus may include provisions for maintaining the session information records, each record associating session information, caller information and callee information for a respective IP communication session. The session information may include the caller and callee port identifiers identifying a caller port and a callee port respectively of the connection provisions through which IP transmissions of the IP communication session are relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The apparatus may include provisions for storing the session identifier received in the IP transmission in the caller session identifier field in one of the session information records, when the pre-determined IP transmission is received from the caller, and provisions for storing the session identifier received in the IP transmission in the callee session identifier field in one of the session information records, when the pre-determined IP transmission is received from the callee.

The apparatus may include provisions for causing the connection provisions to forward the IP transmission to the callee at the callee IP address and callee port identified by the callee IP address identifier respectively and callee port identifier of the session information record, and provisions for identifying the source of the IP transmission forwarded to the callee with the callee port identifier, when the IP transmission was received at the caller port.

The apparatus may include provisions for causing the connection provisions to forward the IP transmission to the caller at the caller IP address and caller port identified by the caller IP address identifier and caller port identifier respectively of the session information record, and provisions for identifying the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data, the caller port may be a caller RTP port and the callee port may be a callee RTP port.

In accordance with another aspect, there is provided a media relay apparatus for facilitating uninterrupted transmission of Internet protocol (IP) transmissions during endpoint changes. The apparatus includes a processor circuit operably configured to define caller and callee ports on a network and operably configured to relay IP transmissions of an IP communication session between a defined caller port and a defined callee port. The processor circuit is further configured to locate a session information record having a caller port identifier or a callee port identifier matching a destination port identifier included in the IP transmission. The caller port identifier identifies the caller port and the callee port identifier identifies the callee port. The processor circuit is further configured to set a source IP address identifier and the source port identifier in the IP transmission as the caller IP address identifier and caller port identifier respectively of the session information record when the destination port identifier in the IP transmission matches the caller port identifier of the session information record, and when the source IP address identifier or a source port identifier in the IP transmission do not match a caller IP address identifier or the caller port identifier respectively of the session information record, and when a session identifier in the IP transmission matches a caller session identifier in the session information record. The apparatus further includes setting the source IP address identifier and the source port identifier of the IP transmission as the callee IP address identifier and the callee port identifier respectively of the session information record when the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record.

The processor circuit may be further configured to maintain the session information records, each record associating session information, caller information and callee information for a respective IP communication session. The session information may include the caller and callee port identifiers identifying a caller port and a callee port respectively through which IP transmissions of the IP communication session to be relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The processor circuit may be further configured to store the session identifier received in the IP transmission in the caller session identifier field in the one of the session information records, when the pre-determined IP transmission is received from the caller, and to store the session identifier received in the IP transmission in the callee session identifier field in the session information record, when the pre-determined IP transmission is received from the callee.

The processor circuit may be further configured to forward the IP transmission to the callee at the callee IP address and callee port identified by the callee IP address identifier and callee port identifier respectively of the session information record, and identify the source of the IP transmission forwarded to the callee with the callee port identifier, when the IP transmission was received at the caller port.

The processor circuit may be further configured to forward the IP transmission to the caller at the caller IP address and caller port identified by the caller IP address identifier and caller port identifier respectively of the session information record, and identify the source of the IP transmission forwarded to the caller with the caller port identifier, when the IP transmission was received at the callee port.

The session identifier may include a synchronization source (SSRC) identifier, the caller session identifier may include a caller SSRC identifier and the callee session identifier may include a callee SSRC identifier.

The IP transmission may contain real time transport protocol (RTP) data and the caller port may be a caller RTP port and the callee port may be a callee RTP port.

In accordance with another aspect, there is provided a media relay apparatus for facilitating uninterrupted transmission of Internet Protocol (IP) transmissions during endpoint changes. The apparatus includes a network interface providing a connection to a network, and a processor circuit in communication with the network interface, the processor circuit including a processor and a non-transitory computer readable medium in communication with the processor. The non-transitory computer readable medium is encoded with codes for directing the processor to define caller and callee ports on the network, and to relay IP transmissions of an IP communication session between a defined caller port and a defined callee port. The codes further include codes for directing the processor to locate a session information record having a caller port identifier or a callee port identifier matching a destination port identifier included in the IP transmission. The caller port identifier identifies the caller port and the callee port identifier identifies the callee port. The codes further include codes for directing the processor to set the source IP address identifier and the source port identifier in the IP transmission as the caller IP address identifier and caller port identifier respectively of the session information record when the destination port identifier in the IP transmission matches the caller port identifier of the session information record, and when a source IP address identifier or a source port identifier in the IP transmission do not match a caller IP address identifier or the caller port identifier respectively of the session information record, and when a session identifier in the IP transmission matches a caller session identifier in the session information record. The codes further include codes for directing the processor to set the source IP address identifier and the source port identifier of the IP transmission as the callee IP address identifier and the callee port identifier respectively of the session information record when the destination port identifier in the IP transmission matches the callee port identifier of the session information record, and when the source IP address identifier or the source port identifier in the IP transmission do not match a callee IP address identifier or the callee port identifier respectively of the session information record, and when the session identifier in the IP transmission matches a callee session identifier in the session information record.

The non-transitory computer readable medium may be further encoded with codes for directing the processor to maintain the session information records, each record associating session information, caller information and callee information for a respective IP communication session. The session information may include the caller and callee port identifiers identifying a caller port and a callee port respectively of the connection through which IP transmissions of the IP communication session to be relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The non-transitory computer readable medium may be further encoded with codes for directing the processor to store the session identifier received in the IP transmission in the caller session identifier field in the session information record, when the pre-determined IP transmission is received from the caller, and to store the session identifier received in the IP transmission in the callee session identifier field in the one of the session information records, when the pre-determined IP transmission is received from the callee.

The non-transitory computer readable medium may be further encoded with codes for directing the processor to forward the IP transmission to the callee at the callee IP address and callee port identified by the callee IP address identifier and callee port identifier respectively of the session information record, and to identify the source of the IP transmission forwarded to the callee with the callee port identifier, when the IP transmission was received at the caller port.

The non-transitory computer readable medium may be further encoded with codes for directing the processor to forward the IP transmission to the caller at the caller IP address and caller port identified by the caller IP address identifier and caller port identifier respectively of the session information record, and to identify the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data and the caller port may be a caller RTP port and the callee port may be a callee RTP port.

In accordance with another aspect, there is provided a non-transitory computer readable medium encoded with codes for controlling a processor of a media relay apparatus to facilitate uninterrupted transmission of Internet Protocol (IP) transmissions during endpoint changes. The codes are operable to cause the processor to cause the media relay to act as a network interface providing a connection to a network, define caller and callee ports on the network, and relay IP transmissions of an IP communication session between a defined caller port and a defined callee port. The codes are also operable to cause the processor to locate a session information record having a caller port identifier or a callee port identifier matching a destination port identifier included in the IP transmission. The caller port identifier identifies the caller port and the callee port identifier identifies the callee port. The codes are further operable to cause the processor to further set a source IP address identifier and a source port identifier in the IP transmission as a caller IP address identifier and caller port identifier respectively of the session information record when the destination port identifier in the IP transmission matches the caller port identifier of the session information record, and when a source IP address identifier or a source port identifier in the IP transmission do not match the caller IP address identifier or the caller port identifier respectively of the session information record and when a session identifier in the IP transmission matches a caller session identifier in the session information record. The codes further include codes for directing the processor to set the source IP address identifier and the source port identifier of the IP transmission as the callee IP address identifier and the callee port identifier respectively of the session information record when the destination port identifier in the IP transmission matches the callee port identifier of the session information record and when the source IP address identifier or the source port identifier in the IP transmission do not match a callee IP address identifier or the callee port identifier respectively of the session information record and when the session identifier in the IP transmission matches a callee session identifier in the session information record.

The computer readable medium may be further encoded with codes for directing the processor to maintain the session information records, each record associating session information, caller information and callee information for a respective IP communication session. The session information may include the caller and callee port identifiers identifying a caller port and a callee port respectively of the connection through which IP transmissions of the IP communication session are relayed. The caller information may include the caller IP address identifier and the caller port identifier to which IP transmissions received at the callee port are transmitted from the caller port, and a caller session identifier. The callee information may include the callee IP address identifier and the callee port identifier to which IP transmissions received at the caller port are transmitted from the callee port, and a callee session identifier.

The computer readable medium may be further encoded with codes for directing the processor to store the session identifier received in the IP transmission in the caller session identifier field in the session information record, when the pre-determined IP transmission is received from the caller, and store the session identifier received in the IP transmission in the callee session identifier field in the session information record, when the pre-determined IP transmission is received from the callee.

The computer readable medium may be further encoded with codes for directing the processor to forward the IP transmission to the callee at the callee IP address and callee port identified by the callee IP address identifier and callee port identifier respectively of the session information record, and to identify the source of the IP transmission forwarded to the callee with the callee port identifier, when the IP transmission was received at the caller port.

The computer readable medium may be further encoded with codes for directing the processor to forward the IP transmission to the caller at the caller IP address and caller port identified by the caller IP address identifier and caller port identifier respectively of the session information record, and to identify the source of the IP transmission forwarded to the caller with the caller port identifier, when the IP transmission was received at the callee port.

The session identifier may include synchronization source (SSRC) identifier, the caller session identifier may include a caller SSRC identifier and the callee session identifier may include a callee SSRC identifier.

The IP transmission may contain real time transport protocol (RTP) data and the caller port may be a caller RTP port and the callee port may be a callee RTP port.

Other aspects and features of the present disclosure will become apparent to those ordinarily skilled in the art upon review of the following description of specific embodiments in conjunction with the accompanying figures.

BRIEF DESCRIPTION OF THE DRAWINGS

In drawings which illustrate embodiments,

FIG. 2 is a tabular representation of a call record used by the system shown in FIG. 1.

FIG. 3 is a flow chart of an authentication routine executed by a processor of a media relay shown in the system shown in FIG. 1.

FIG. 7 is a tabular representation of the call record as updated after execution of the continuity routine shown in FIG. 6 when a pre-determined packet is received in the IP transmission.

FIG. 8 is a tabular representation of the call record shown in FIG. 7 further updated by the continuity routine after an IP transmission received subsequent to the pre-determined packet is received.

DETAILED DESCRIPTION OF CERTAIN EMBODIMENTS

Figure 1:
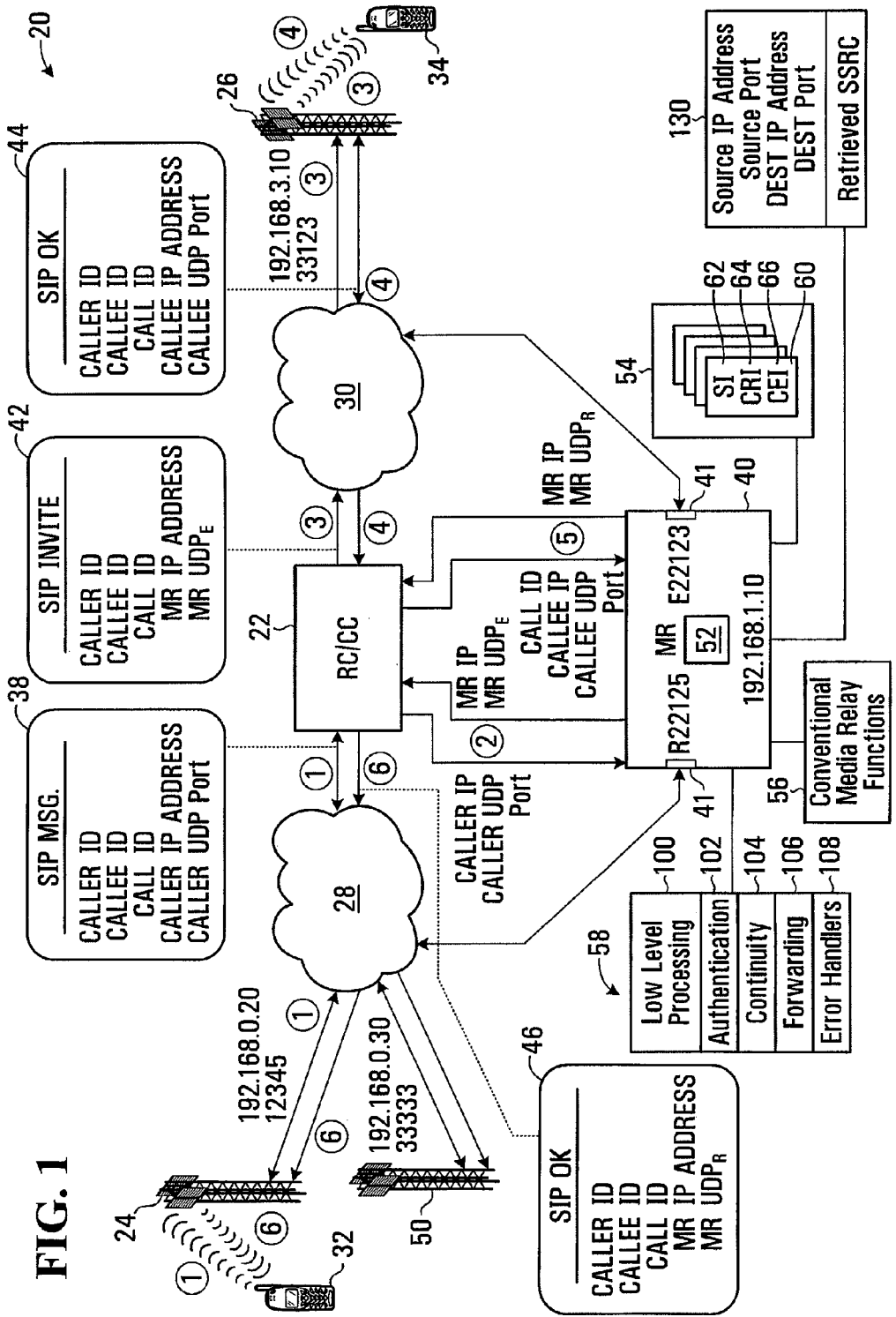
FIG. 1 is a schematic diagram illustrating a system for facilitating uninterrupted transmission of internet protocol (IP) transmissions containing real time transport protocol (RTP) data during endpoint changes, according to a first embodiment.

Referring to FIG. 1, a system for handling voice over internet protocol (IP) transmissions and more generally, IP transmissions, is shown generally at 20. The system 20 includes a routing controller/call controller (RC/CC) system 22 and first, second and third base stations 24, 26 and 50. The base stations 24, 26 and 50 are operable to communicate with the RC/CC 22 via a network or, as shown in this embodiment, separate networks 28 and 30, which in this embodiment depict the internet. The first and second base stations 24 and 26 in this embodiment are operable to communicate with caller and callee mobile telephones 32 and 34 respectively using a cellular wireless network in a conventional manner as is known in the art. The first and second base stations 24 and 26 thus act as "endpoints" for IP transmissions between the caller and callee.

Generally, to establish a call from the caller mobile telephone 32 to the callee mobile telephone 34, the caller mobile telephone transmits to the first base station 24 a session initiation protocol (SIP) message shown generally at 38. The SIP message 38 is transmitted from the caller mobile telephone 32 to the base station 24 and the first base station 24 formats the SIP message 38 into an IP transmission and transmits the IP transmission through the internet 28 to the RC/CC 22. In this embodiment, the first base station 24 is preconfigured with a network IP address 192.168.0.20 and universal datagram protocol (UDP) port 12345.

In response to receipt of the SIP message 38, the RC/CC 22 communicates with a media relay 40 and sends the caller IP address identifier and caller UDP port identifier contained in the SIP message to the media relay 40 to identify the IP address and UDP port to which the media relay 40 should send communications to the first base station 24 for receipt by the caller mobile telephone 32.

The media relay 40 has input/output interfaces 41 in communication with the processor to provide for physical connection to an IP network such as the internet. The media relay 40 is programmed to provide a logical input/output interface that interacts with the input/output interfaces 41 to define caller and callee real time transport protocol (RTP) ports in the conventional manner.

In response, the media relay 40 is configured to send a media relay IP address identifier and media relay RTP port identifier that it associates with the callee identified by the contents of the callee ID field in the SIP message 38. The media relay 40 sends this information to the RC/CC 22 to essentially inform the RC/CC 22 of the media relay IP address identifier and callee RTP port identifier that it should convey to the callee mobile telephone 34 so that the callee telephone can cause IP transmissions to be sent from the second base station, 26 to the media relay 40 which can then subsequently forward those transmissions to the caller mobile telephone 32.

In response to receipt of the media relay IP address identifier and the callee RTP port identifier designated by the media relay 40, the RC/CC 22 transmits a SIP invite message 42 through the internet 30 to the callee mobile telephone 34 through the second base station 26. In this embodiment, the second base station 26 has an IP address (192.168.3.10) and a UDP port number (33123). Thus, the RC/CC 22 directs this SIP invite message 42 to the IP address and UDP port associated with the callee mobile telephone 34 by the second base station 26. The second base station 26 then communicates this SIP invite message 42 to the callee mobile telephone 34 over the wireless network and the callee mobile telephone 34 returns a SIP okay message 44 to the second base station 26.

The SIP okay message format is shown at 44 and includes a caller identifier (ID), a callee ID, a call ID, a callee IP address identifier and a callee UDP port identifier. The callee IP address identifier is the IP address of the second base station 26 and the callee UDP port identifier is the UDP port identifier associated with the callee mobile telephone 34 by the second base station 26. The second base station 26 sends the SIP okay message 44 in an IP transmission through the internet 30 to the RC/CC 22 which communicates the call ID, callee IP address identifier, and callee UDP port identifier contained in the SIP okay message 44 to the media relay 40 to identify to the media relay the IP address and UDP port associated with the callee. In response, the media relay 40 sends a reply message to the RC/CC 22 containing a media relay IP address identifier and caller RTP port identifier of a caller RTP port assigned by the media relay, to which the first base station 24 should direct IP transmissions to the media relay for receipt by the callee mobile telephone 34. In this embodiment, this message includes a media relay IP address identifier of 192.168.1.10 and a caller RTP port identifier (R22125).

The RC/CC 22 transmits a SIP okay message 46, having a format as shown, through the internet 28 to the first base station 24 and the first base station communicates the media relay IP address identifier and the caller RTP port identifier associated with the caller to the caller mobile telephone 32.

The above basic communications for establishing a call between the caller and callee mobile telephones 32 and 34 are described in further detail in Applicant's related International Application No. PCT/CA2007/002150. Of interest in connection with the present disclosure is the following way in which the media relay 40 is configured to permit the caller mobile telephone 32 to move to another geographical location in which a handoff occurs between the first base station 24 and the third base station 50 having an IP address identifier and UDP port identifier different from that of the first base station 24.

When a handoff from the first base station 24 to the third base station 50 occurs, the caller mobile telephone 32 ceases communication with the first base station 24 and establishes communication with the third base station 50. However, since the third base station 50 has a different IP address identifier and UDP port identifier than the first base station 24, the media relay 40 will receive IP transmissions from the third base station 50 identifying the source of the transmissions with a different IP address identifier and UDP port identifier than those associated with the first base station. Normally, the media relay 40 would reject such communications as being from an unknown source, however, due to the configuration of the media relay described below, IP transmissions from the third base station 50 are not rejected and the call can continue uninterrupted. To facilitate this, the media relay 40 is configured with additional functionality beyond that which merely relays communications between the caller and callee.

It is known that in general, a media relay 40 includes a processor 52, memory 54 operable to be written to and read by the processor 52, and program memory 56 containing codes readable by the processor 52 that define program instructions for directing the processor 52 to carry out conventional media relay functions for transferring IP transmissions between the caller and the callee. In order to provide the functionality of the present disclosure, in this embodiment, the media relay 40 is further configured with additional codes shown generally at 58 that direct the processor 52 to carry out the functionality described below and include functionality for configuring the memory 54 to include call records 60.

These additional codes 58 may be stored on a computer readable medium such as a CD-ROM, flash drive, or in memory at a remotely located computer and may be downloaded to the program memory 56 or the media relay 40 in a conventional manner, for example.

Referring to FIG. 2, an exemplary call record is shown generally at 60. Each call record associates session information 62, caller information 64 and callee information 66 for an IP communication session (i.e. call) handled by the media relay 40. The session information 62 includes caller and callee RTP port identifier fields 68 and 70 for storing caller and callee RTP port identifiers identifying caller and callee RTP ports respectively of the media relay 40. In this embodiment, the caller RTP port identifier is R22125 and the callee RTP port identifier is E22123. The session information 62 may also include a caller RTCP port identifier field and a callee RTCP port identifier field, however, these are optional.

The caller information 64 includes a caller IP address identifier field 72 and a caller UDP port identifier field 74 that hold a caller IP address identifier and caller port UDP identifier to which IP transmissions received at the callee RTP port are to be transmitted. In this embodiment, the caller IP address identifier is 192.168.0.20 and the caller UDP port identifier is 12345 and correspond to those of the first base station 24, i.e. that associated with the caller. The caller information 64 further includes a caller sync source (SSRC) identifier field 76 for storing a caller sync source identifier associated with the caller side of the IP communication session. In one embodiment, until a pre-determined packet such as a first packet, for example, is received in connection with the call, this caller SSRC identifier is undefined.

In the embodiment shown, the caller information 64 further includes a packets sent field 78 and a packets received field 80 for holding numbers representing the number of packets sent to and received respectively from the caller although these fields are optional and the contents of these fields may be available from other functions on the media relay 40.

Referring to FIG. 2, the callee information 66 includes a callee IP address identifier field 82 and a callee UDP port identifier field 84 that hold a callee IP address identifier and callee UDP port identifier identifying a callee address and UDP port to which IP transmissions received at the caller RTP port are to be transmitted. In this embodiment, the callee IP address identifier is 192.168.3.10 and the callee UDP port identifier is 33123 and correspond to those of the second base station 26, i.e., that is associated with the callee. The callee information 66 also includes a callee sync source (SSRC) identifier field 86 for storing a callee sync source identifier associated with the callee side of the IP communication session. In one embodiment, this callee SSRC identifier field 86 may be unpopulated until a predefined packet such as the first packet, for example, of the IP transmissions associated with the call is received.

In this embodiment, the callee information 66 also includes a packets sent field 88 and a packets received field 90 for storing numbers indicating the number of packets sent to and received from the caller. The call record 60 is populated with the information shown in FIG. 2 during the course of the normal message exchanges between the RC/CC 22, the caller and callee and the media relay 40 described above that communicate to the caller and callee the media relay IP address and respective RTP port identifiers (R22125 and E22123) to which communications are to be sent.

Referring back to FIG. 1, the additional codes 58 for directing the processor 52 of the media relay 40 to carry out the functions that facilitate uninterrupted transmissions of IP transmissions include codes 100 for effecting a low level processing routine, codes 102 for effecting an authentication routine, codes 104 for effecting a continuity routine, codes 106 for effecting a forwarding routine and codes 108 for effecting error handler routines. The functionality of the low level processing routine codes 100 is not shown but generally relates to processing associated with layers 0 to 4 of the 7 layer ISO IP transmission protocol.

Referring to FIG. 3, the functionality of the authentication routine is shown generally at 102. Before describing this routine, however, please refer to FIG. 4 which describes the generic nature of an IP transmission and the important fields of that transmission for effecting the use of the methods described herein.

Figures 4, 5:
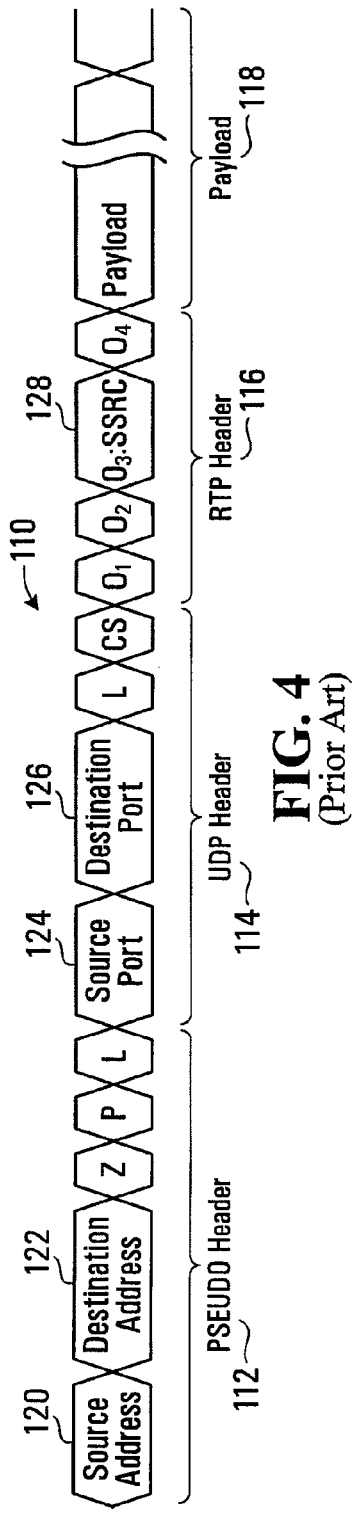
FIG. 4 is a schematic representation of an internet protocol (IP) transmission according to the prior art.
FIG. 5 is a tabular representation of the call record shown in FIG. 2 as updated after receipt of an IP transmission at a caller port of the media relay shown in FIG. 1.

In FIG. 4, an IP transmission is shown generally at 110 and includes a PSEUDO header 112, a UDP header 114, a RTP header 116, and a payload 118. The PSEUDO header 112 includes various fields, the most important of which, in this embodiment, are source IP address identifier and destination address identifier fields 120 and 122 respectively. The UDP header 114 includes source port and destination port identifier fields 124 and 126 and the RTP header 116 includes a SSRC identifier field 128. The payload 118 includes data representing, in this embodiment, audio and/or video data transmitted between the caller and the callee.

Referring back to FIG. 3, the authentication routine 102 is executed in response to receipt of an IP transmission 110 at either the caller RTP port R22125 of the media relay 40 or at the callee RTP port E22123 of the media relay. In response to receipt of an IP transmission 110 at either of these ports, the processor 52 of the media relay 40 is directed to store the source IP address contained in the source IP address identifier field 120, the source port identifier contained in the source port identifier field 124, the destination IP address contained in the destination IP address identifier field 122 and the destination port identifier contained in the destination port identifier field 126 in fields by the same name in a buffer memory 130 addressable by the processor 52. The low level processing routine codes 100 will perform the necessary functions to cleanly extract this information and in this embodiment, the storing of this information is effected by the authentication routine 102, as shown at 129. Alternatively, the low level processing routine codes 100 may store this information directly in the buffer memory 130. It will be appreciated that the buffer memory 130 may include separately addressable fields storing the respective information.

Referring to FIG. 5, upon completion of the execution of block 129 or the low level processing routine codes 100, the call record 60 is updated with the number of packets received as shown at 136 where it is indicated that one packet has been received from the callee, for example.

Referring back to FIG. 3, the authentication routine 102 further includes a block 132 that directs the processor 52 to find a call record such as shown at 60 in the memory 54 by matching the destination port identifier with at least one of the contents of the caller RTP port identifier field 74 and the contents of the callee RTP port identifier field 84 of any of the call records. To do this, the codes in block 132 may direct the media relay processor 52 to scan through all of the caller RTP port identifier fields and callee RTP port identifier fields of all of the call records 60 to find a match with the destination port identifier stored in the buffer memory 130.

Referring to FIG. 3, block 134 directs the processor 52 to invoke an error handler as shown at 108 if no record is found and to proceed to execute the code 104 associated with the continuity routine if a record is found.

Figure 6:
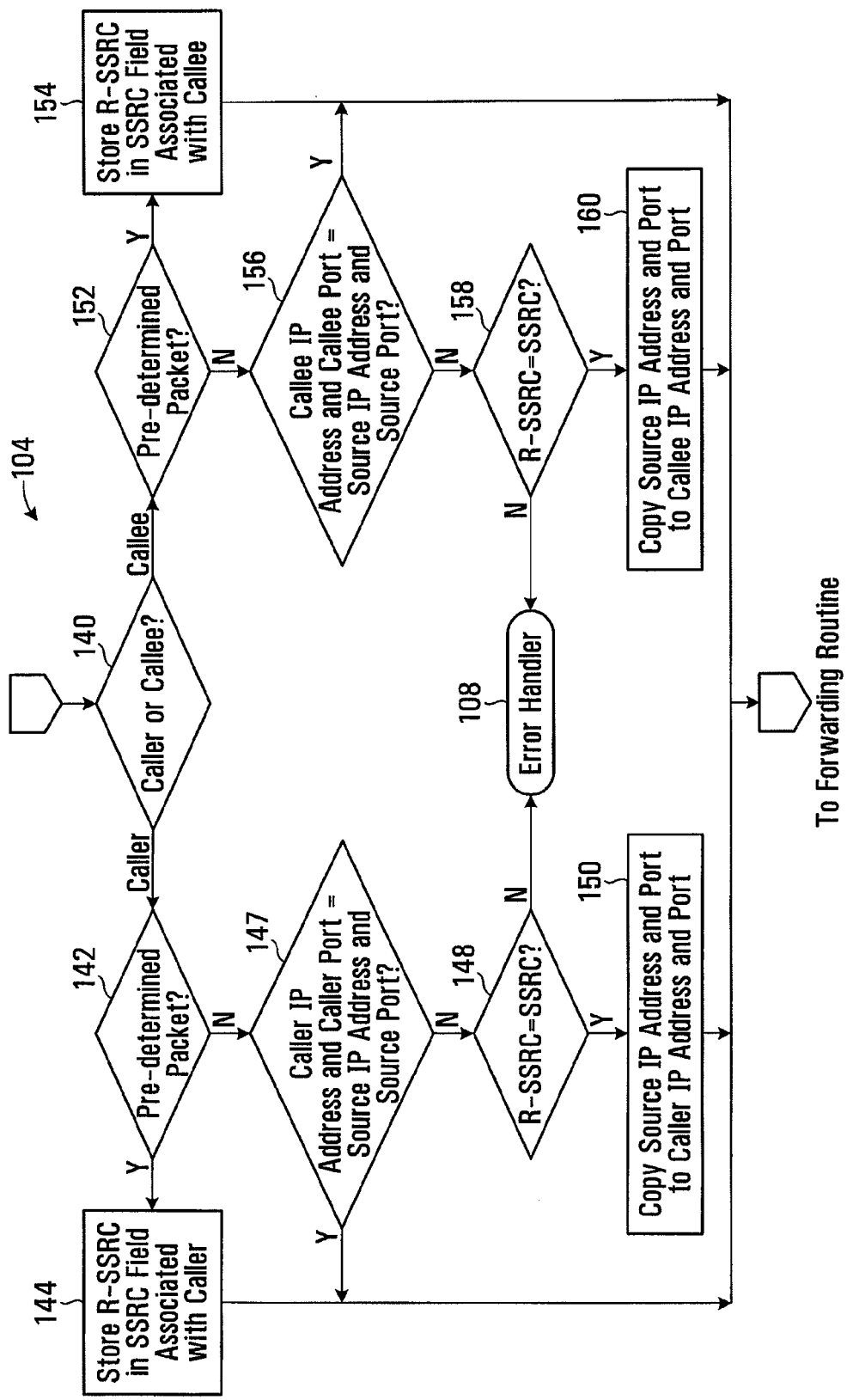
FIG. 6 is a flow chart of a continuity routine executed by the processor of the media relay shown in FIG. 1.

Referring to FIG. 6, the continuity routine 104 begins with a first block 140 which directs the processor 52 to determine whether or not the IP transmission 110 has been received at the caller RTP port or the callee RTP port.

The identification of whether or not the IP transmission 110 is from the caller or callee can occur in a number of ways. One way, for example, is for the processor 52 to be responsive to interrupt signals that may be produced by the input/output interface circuitry 41 that physically implements the interface between the media relay 40 and the internet. Since the caller RTP port and callee RTP port have different port identifiers, the input/output interface circuitry 41 may identify the port which has received an IP transmission 110 and cause an interrupt signal and perhaps an interrupt handler (not shown) to be executed by the processor 52 in order to identify the specific port which has received the IP transmission 110.

Alternatively, when the processor 52 identifies the call record 60 by matching the destination port identifier received from the IP transmission 110 with at least one of the caller RTP port identifier and callee RTP port identifier in a call record, the matching RTP port identifier is inherently identified and this information can be used to identify the specific port that has received the IP transmission 110. A flag (not shown) may be set for example, to identify whether the IP transmission 110 is from the caller or callee, depending on whether there is a match of the destination port identifier with the callee or caller RTP identifier. Thus, if there is a match of the destination port identifier with the callee RTP port identifier, then the source must be the caller and if there is a match of the destination port identifier with the caller RTP port identifier, then the source must be the callee.

Thus, if a flag is used, block 140 can simply cause the processor 52 to read the flag to determine whether or not the IP transmission 110 is received from the caller or callee.

Assuming the IP transmission 110 is received from the caller, optionally, block 142 can direct the processor 52 to determine whether or not a pre-determined packet has been received. In this embodiment, the pre-determined packet is the first packet and thus can be determined by simply reading the contents of the packets received field 80 in the caller information 64 of the call record 60 identified at block 132 of the authentication routine 102. Alternatively, the low level processing codes 100 may have previously stored the number of packets received in some other location readable by the processor 52 for use at this stage.

In this embodiment, the first packet received from the caller is the pre-determined packet and thus, when the first packet is received, block 144 directs the processor 52 to store the SSRC identifier received in the IP transmission 110 in the caller SSRC field 76 associated with the caller information 64 of the call record 60 as shown at 146 in FIG. 7. The processor 52 is then directed to the forwarding routine 106. If at block 142, the IP transmission 110 includes a packet that is not the pre-determined packet, in particular, a packet received subsequent to the pre-determined packet, or where there will be no determination as to whether the received packet is a pre-determined packet, block 147 directs the processor 52 to determine whether the caller IP address identifier and caller port identifier in the caller information 64 of the call record 60 match the source IP address identifier and source port identifier received in the IP transmission 110. If so, the IP transmission 110 has been received from the pre-established source (in this embodiment, the first base station 24) and therefore, the processor 52 is directed to the forwarding routine 106.

If at block 147 the caller IP address identifier and caller port identifier do not match the source IP address identifier and source port identifier, then the IP transmission 110 is deemed to be originating from a different source (i.e. the third base station 50) in which case block 148 directs the processor 52 to determine whether or not the IP transmission is associated with the call represented by the call record 60. To do this, block 148 directs the processor 52 to determine whether the SSRC identifier received in the IP transmission 110 matches the caller SSRC identifier stored in the caller sync source field 76 of the call record 60 shown in FIG. 7. If not, the processor 52 is directed to an error handling routine 108.

If the SSRC received in the IP transmission 110 matches the caller SSRC stored in the caller sync source field 76 of the call record 60, block 150 directs the processor 52 to copy the source IP address identifier and source port identifier respectively to the caller IP address identifier and caller UDP port identifier fields 72 and 74 respectively of the call record 60 to update the call record to identify the IP address and UDP port of the third base station 50 as that of the caller, as shown in FIG. 8. The processor 52 is then directed to the call forwarding routine 106.

Thus, in an IP transmission 110 received subsequent to the pre-determined transmission, or where there is no determination of whether the transmission is a pre-determined one, the source IP address identifier and source port identifier from the IP transmission 110 are set as the caller IP address identifier and caller port identifier respectively of the call record 60 when the caller IP address identifier and caller port identifier of the record do not match the source IP address identifier and source port identifier respectively of the IP transmission 110 and the received SSRC in the IP transmission matches the caller SSRC identifier of the call record.

Similarly, blocks 152, 154, 156, 158, and 160 function to perform similar functionality when the destination port identifier in the IP transmission 110 matches the callee RTP port identifier of the identified call record 60. In this case where there is a determination of whether the transmission is a pre-determined one, if the IP transmission is the pre-determined transmission, the SSRC identifier received in the IP transmission 110 is set as the callee SSRC identifier associated with the callee information 66 of the record 60 and if the IP transmission is received subsequent to the pre-determined transmission, or where there is no determination of whether the transmission is a pre-determined one, the source IP address identifier and source port identifier from the IP transmission are set as the callee IP address identifier and callee port identifier respectively of the record when the callee IP address identifier and callee port identifier do not match the source IP address identifier and source port identifier respectively and the received SSRC identifier in the IP transmission matches the callee SSRC identifier.

Figure 9:
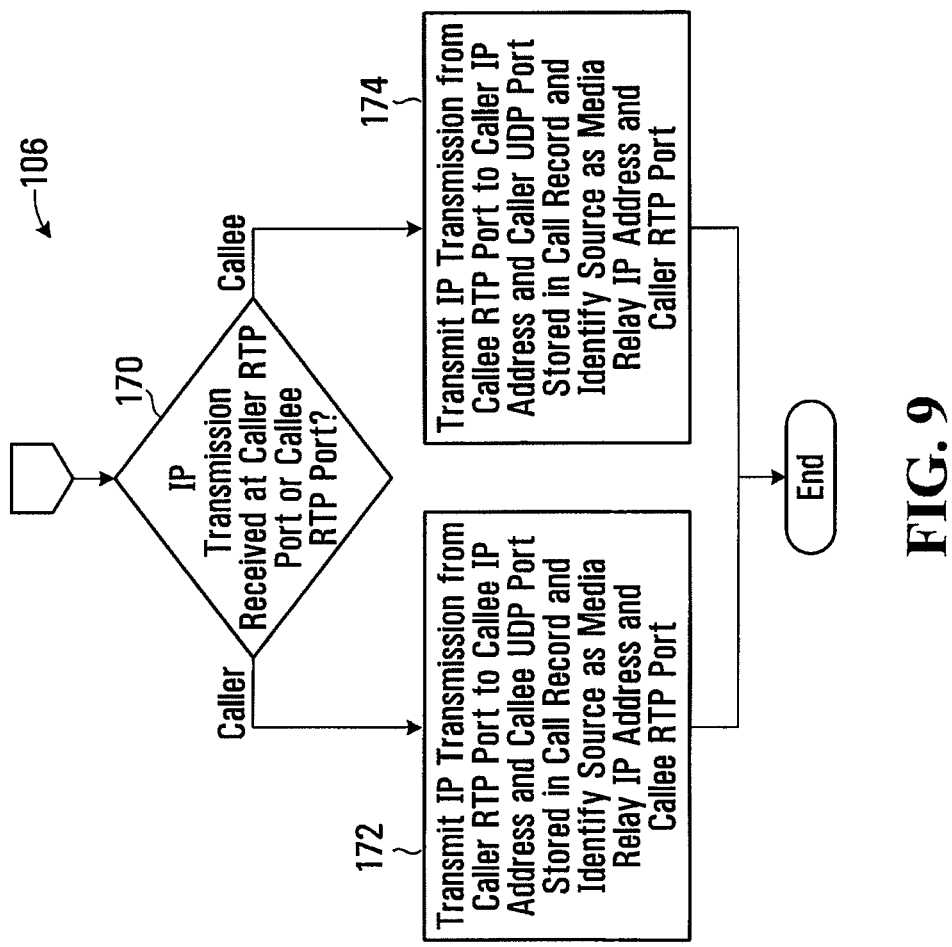
FIG. 9 is a flow chart of a forwarding routine executed by the processor of the media relay shown in FIG. 1 to relay the received IP transmission to a caller or callee with a source identification provided by the call record as updated by the continuity routine shown in FIG. 6.

Referring to FIG. 9, the forwarding routine is shown generally at 106. The forwarding routine includes a first block 170 that directs the processor 52 to again determine whether or not the IP transmission 110 has been received at the caller RTP port or callee RTP port. Again, this may be determined by reading the flag described above or by simply reading a memory location identifying the RTP port that received the IP transmission 110.

If the IP transmission 110 has been received at the caller RTP port, block 172 directs the processor 52 to transmit the IP transmission from the caller RTP port to the callee IP address and callee UDP port identified by the callee IP address identifier and callee UDP port identifier in the call record 60 and to identity the source IP address and source port of the IP transmission as the media relay IP address and callee RTP port. If on the other hand, the IP transmission 110 was received at the callee RTP port, block 174 directs the processor 52 to transmit the IP transmission from the callee RTP port to the caller IP address identified by the caller IP address identifier and caller UDP port identifier stored in the call record 60 and identify the source IP address and source port of the IP transmission as the media relay IP address and caller RTP port. The IP transmission 110 received at either port is thus relayed by the media relay 40 according to the contents of the call record 60 as previously established by the continuity routine 104 shown in FIG. 6.

It will be appreciated that in this embodiment, the IP transmissions 110 received from the caller and from the callee may have different SSRC identifiers. Alternatively, they may have the same SSRC identifiers.

What is claimed is:

1. A method for facilitating uninterrupted transmission of Internet Protocol (IP) transmissions, during endpoint changes, the method comprising:
   in response to receiving an IP transmission at a caller port or a callee port of a media relay through which IP transmissions of an IP communication session are relayed,
   a) locating a session information record having a caller port identifier or callee port identifier matching a destination port identifier in the IP transmission, wherein the caller port identifier identifies the caller port and the callee port identifier identifies the callee port; and
   b) when:
      i) the destination port identifier in the IP transmission matches the caller port identifier of the session information record; and
      ii) a source IP address identifier or a source port identifier in the IP transmission do not match a caller IP address identifier or the caller port identifier respectively of the session information record; and
      iii) a session identifier in the IP transmission matches a caller session identifier in the session information record:
   setting the source IP address identifier and the source port identifier in the IP transmission as the caller IP address identifier and caller port identifier respectively of the session information record; and
   c) when:
      i) the destination port identifier in the IP transmission matches the callee port identifier of the session information record; and
      ii) the source IP address identifier or the source port identifier in the IP transmission do not match a callee IP address identifier or the callee port identifier respectively of the session information record; and
      iii) the session identifier in the IP transmission matches a callee session identifier in the session information record;
   setting the source IP address identifier and the source port identifier of the IP transmission as the callee IP address identifier and the callee port identifier respectively of the session information record.

2. The method of claim 1, further comprising:
   maintaining the session information records, each record associating session information, caller information and callee information for a respective IP communication session;
      the session information including the caller and callee port identifiers identifying a caller port and a callee port respectively of the media relay through which IP transmissions of the IP communication session are relayed;
      the caller information including the caller IP address identifier and the caller port identifier to which IP transmissions received at the callee port are transmitted from the media relay, and a caller session identifier; and
      the callee information including the callee IP address identifier and the callee port identifier to which IP transmissions received at the caller port are transmitted from the media relay, and a callee session identifier.

3. The method of claim 2, further comprising:
   storing the session identifier received in the IP transmission in the caller session identifier field in the one of the session information records, when the pre-determined IP transmission is received from the caller; and
   storing the session identifier received in the IP transmission in the callee session identifier field in the one of the session information records, when the pre-determined IP transmission is received from the callee.

4. The method of claim 1, further comprising:
   causing the media relay to forward the IP transmission to the callee at the callee IP address and callee port identified by the callee IP address identifier and callee port identifier respectively of the session information record and identifying the source of the IP transmission forwarded to the callee with the callee port identifier, when the IP transmission was received at the caller port.

5. The method of claim 4, further comprising:
   causing the media relay to forward the IP transmission to the caller at the caller IP address and caller port identified by the caller IP address identifier and caller port identifier respectively of the record and identifying the source of the IP transmission forwarded to the caller with the caller port identifier, when the IP transmission was received at the callee port.

6. The method of claim 1, wherein the session identifier includes synchronization source (SSRC) identifier, the caller session identifier includes a caller SSRC identifier and the callee session identifier includes a callee SSRC identifier.

7. The method of claim 1, wherein the IP transmission contains real time transport protocol (RTP) data and wherein the caller port is a caller RTP port and the callee port is a callee RTP port.

8. A media relay apparatus for facilitating uninterrupted transmission of Internet Protocol (IP) transmissions during endpoint changes, the apparatus comprising:
   connection means for providing a connection to an IP network;
   means for defining a logical input/output interface defining caller and callee ports in the connection means;
   means for relaying IP transmissions of an IP communication session between a caller port and a callee port of the connection means;
   means for receiving an IP transmission at the caller port or the callee port;
   means for locating a session information record having a caller port identifier or a callee port identifier matching a destination port identifier included in the IP transmission, wherein the caller port identifier identifies the caller port and the callee port identifier identifies the callee port; and
   means for setting a source IP address identifier and a source port identifier in the IP transmission as the caller IP address identifier and caller port identifier respectively of the session information record when:
      i) the destination port identifier in the IP transmission matches the caller port identifier of the session information record; and
      ii) the source IP address identifier or the source port identifier in the IP transmission do not match a caller IP address identifier or the caller port identifier respectively of the session information record; and iii) a session identifier in the IP transmission matches a caller session identifier in the session information record; and means for setting the source IP address identifier and the source port identifier of the IP transmission as the callee IP address identifier and the callee port identifier respectively of the session information record when:
  i) the destination port identifier in the IP transmission matches the callee port identifier of the session information record; and
  ii) the source IP address identifier or the source port identifier in the IP transmission do not match a callee IP address identifier or the callee port identifier respectively of the session information record; and
  iii) the session identifier in the IP transmission matches a callee session identifier in the session information record.

9. The apparatus of claim 8, further comprising:
means for maintaining the session information records, each record associating session information, caller information and callee information for a respective IP communication session;
  the session information including the caller and callee port identifiers identifying a caller port and a callee port respectively of the connection means through which IP transmissions of the IP communication session are relayed;
  the caller information including the caller IP address identifier and the caller port identifier to which IP transmissions received at the callee port are transmitted from the caller port, and a caller session identifier; and
  the callee information including the callee IP address identifier and the callee port identifier to which IP transmissions received at the caller port are transmitted from the callee port, and a callee session identifier.

10. The apparatus of claim 9, further comprising:
means for storing the session identifier received in the IP transmission in the caller session identifier field in one of the session information records, when the pre-determined IP transmission is received from the caller; and
means for storing the session identifier received in the IP transmission in the callee session identifier field in one of the session information records, when the pre-determined IP transmission is received from the callee.

11. The apparatus of claim 8, further comprising:
means for causing the connection means to forward the IP transmission to the callee at the callee IP address and callee port identified by the callee IP address identifier respectively and callee port identifier of the session information record; and
means for identifying the source of the IP transmission forwarded to the callee with the callee port identifier, when the IP transmission was received at the caller port.

12. The apparatus of claim 11, further comprising:
means for causing the connection means to forward the IP transmission to the caller at the caller IP address and caller port identified by the caller IP address identifier and caller port identifier respectively of the session information record; and
means for identifying the source of the IP transmission forwarded to the caller with the caller port identifier, when the IP transmission was received at the callee port.

13. The apparatus of claim 8, wherein the session identifier includes synchronization source (SSRC) identifier, the caller session identifier includes a caller SSRC identifier and the callee session identifier includes a callee SSRC identifier.

14. The apparatus of claim 8, wherein the IP transmission contains real time transport protocol (RTP) data and wherein the caller port is a caller RTP port and the callee port is a callee RTP port.

15. A media relay apparatus for facilitating uninterrupted transmission of Internet protocol (IP) transmissions during endpoint changes, the apparatus comprising:
a processor circuit operably configured to define caller and callee ports on a network and operably configured to relay IP transmissions of an IP communication session between a defined caller port and a defined callee port, the processor circuit being further configured to:
  locate a session information record having a caller port identifier or a callee port identifier matching a destination port identifier included in the IP transmission, wherein the caller port identifier identifies the caller port and the callee port identifier identifies the callee port; and
  set a source IP address identifier and the source port identifier in the IP transmission as the caller IP address identifier and caller port identifier respectively of the session information record when:
    i) the destination port identifier in the IP transmission matches the caller port identifier of the session information record; and
    ii) the source IP address identifier or a source port identifier in the IP transmission do not match a caller IP address identifier or the caller port identifier respectively of the session information record; and
    iii) a session identifier in the IP transmission matches a caller session identifier in the session information record; and
  set the source IP address identifier and the source port identifier of the IP transmission as the callee IP address identifier and the callee port identifier respectively of the session information record when:
    i) the destination port identifier in the IP transmission matches the callee port identifier of the session information record; and
    ii) the source IP address identifier or the source port identifier in the IP transmission do not match a callee IP address identifier or the callee port identifier respectively of the session information record; and
    iii) the session identifier in the IP transmission matches a callee session identifier in the session information record.

16. The apparatus of claim 15, wherein the processor circuit is further configured to:
maintain the session information records, each record associating session information, caller information and callee information for a respective IP communication session;
  the session information including the caller and callee port identifiers identifying a caller port and a callee port respectively through which IP transmissions of the IP communication session are relayed;
  the caller information including the caller IP address identifier and the caller port identifier to which IP transmissions received at the callee port are transmitted from the caller port, and a caller session identifier; and
  the callee information including the callee IP address identifier and the callee port identifier to which IP transmissions received at the caller port are transmitted from the callee port, and a callee session identifier.

17. The apparatus of claim 16, wherein the processor circuit is further configured to:
store the session identifier received in the IP transmission in the caller session identifier field in the one of the session information records, when the pre-determined IP transmission is received from the caller; and
store the session identifier received in the IP transmission in the callee session identifier field in the one of the session information records, when the pre-determined IP transmission is received from the callee.

18. The apparatus of claim 15, wherein the processor circuit is further configured to:
forward the IP transmission to the callee at the callee IP address and callee port identified by the callee IP address identifier and callee port identifier respectively of the session information record; and
identify the source of the IP transmission forwarded to the callee with the callee port identifier, when the IP transmission was received at the caller port.

19. The apparatus of claim 18, wherein the processor circuit is further configured to:
forward the IP transmission to the caller at the caller IP address and caller port identified by the caller IP address identifier and caller port identifier respectively of the session information record; and
identify the source of the IP transmission forwarded to the caller with the caller port identifier, when the IP transmission was received at the callee port.

20. The apparatus of claim 15, wherein the session identifier includes synchronization source (SSRC) identifier, the caller session identifier includes a caller SSRC identifier and the callee session identifier includes a callee SSRC identifier.

21. The apparatus of claim 15, wherein the IP transmission contains real time transport protocol (RTP) data and wherein the caller port is a caller RTP port and the callee port is a callee RTP port.

22. A media relay apparatus for facilitating uninterrupted transmission of Internet Protocol (IP) transmissions during endpoint changes, the apparatus comprising:
a network interface providing a connection to a network;
a processor circuit in communication with the network interface, the processor circuit including a processor and a non-transitory computer readable medium in communication with the processor, the non-transitory computer readable medium being encoded with codes for directing the processor to:
define caller and callee ports on the network;
relay IP transmissions of an IP communication session between a defined caller port and a defined callee port;
locate a session information record having a caller port identifier or a callee port identifier matching a destination port identifier included in the IP transmission, wherein the caller port identifier identifies the caller port and the callee port identifier identifies the callee port; and
set the source IP address identifier and the source port identifier in the IP transmission as the caller IP address identifier and caller port identifier respectively of the session information record when:
i) the destination port identifier in the IP transmission matches the caller port identifier of the session information record; and
ii) a source IP address identifier or a source port identifier in the IP transmission do not match a caller IP address identifier or the caller port identifier respectively of the session information record; and
iii) a session identifier in the IP transmission matches a caller session identifier in the session information record; and
set the source IP address identifier and the source port identifier of the IP transmission as the callee IP address identifier and the callee port identifier respectively of the session information record when:
i) the destination port identifier in the IP transmission matches the callee port identifier of the session information record; and
ii) the source IP address identifier or the source port identifier in the IP transmission do not match a callee IP address identifier or the callee port identifier respectively of the session information record; and
iii) the session identifier in the IP transmission matches a callee session identifier in the session information record.

23. The apparatus of claim 22, wherein the non-transitory computer readable medium is further encoded with codes for directing the processor to:
maintain the session information records, each record associating session information, caller information and callee information for a respective IP communication session;
the session information including the caller and callee port identifiers identifying a caller port and a callee port respectively of the connection through which IP transmissions of the IP communication session are relayed;
the caller information including the caller IP address identifier and the caller port identifier to which IP transmissions received at the callee port are transmitted from the caller port, and a caller session identifier; and
the callee information including the callee IP address identifier and the callee port identifier to which IP transmissions received at the caller port are transmitted from the callee port, and a callee session identifier.

24. The apparatus of claim 23, wherein the non-transitory computer readable medium is further encoded with codes for directing the processor to:
store the session identifier received in the IP transmission in the caller session identifier field in the one of the session information records, when the pre-determined IP transmission is received from the caller; and
store the session identifier received in the IP transmission in the callee session identifier field in the one of the session information records, when the pre-determined IP transmission is received from the callee.

25. The apparatus of claim 22, wherein the non-transitory computer readable medium is further encoded with codes for directing the processor to:
forward the IP transmission to the callee at the callee IP address and callee port identified by the callee IP address identifier and callee port identifier respectively of the session information record; and
identify the source of the IP transmission forwarded to the callee with the callee port identifier, when the IP transmission was received at the caller port.

26. The apparatus of claim 25, wherein the non-transitory computer readable medium is further encoded with codes for directing the processor to:
forward the IP transmission to the caller at the caller IP address and caller port identified by the caller IP address identifier and caller port identifier respectively of the session information record; and identify the source of the IP transmission forwarded to the caller with the caller port identifier, when the IP transmission was received at the callee port.

27. The apparatus of claim 22, wherein the session identifier includes synchronization source (SSRC) identifier, the caller session identifier includes a caller SSRC identifier and the callee session identifier includes a callee SSRC identifier.

28. The apparatus of claim 22, wherein the IP transmission contains real time transport protocol (RTP) data and wherein the caller port is a caller RTP port and the callee port is a callee RTP port.

29. A non-transitory computer readable medium encoded with codes for controlling a processor of a media relay apparatus to facilitate uninterrupted transmission of Internet Protocol (IP) transmissions during endpoint changes, the codes being operable to cause the processor to:
cause the media relay to act as a network interface providing a connection to a network;
define caller and callee ports on the network;
relay IP transmissions of an IP communication session between a defined caller port and a defined callee port;
locate a session information record having a caller port identifier or a callee port identifier matching a destination port identifier included in the IP transmission, wherein the caller port identifier identifies the caller port and the callee port identifier identifies the callee port; and
set a source IP address identifier and a source port identifier in the IP transmission as a caller IP address identifier and caller port identifier respectively of the session information record when:
  i) the destination port identifier in the IP transmission matches the caller port identifier of the session information record; and
  ii) the source IP address identifier or the source port identifier in the IP transmission do not match the caller IP address identifier or the caller port identifier respectively of the session information record; and
  iii) a session identifier in the IP transmission matches a caller session identifier in the session information record; and
set the source IP address identifier and the source port identifier of the IP transmission as the callee IP address identifier and the callee port identifier respectively of the session information record when:
  i) the destination port identifier in the IP transmission matches the callee port identifier of the session information record; and
  ii) the source IP address identifier or the source port identifier in the IP transmission do not match a callee IP address identifier or the callee port identifier respectively of the session information record; and
  iii) the session identifier in the IP transmission matches a callee session identifier in the session information record.

30. The non-transitory computer readable medium of claim 29, wherein the computer readable medium is further encoded with codes for directing the processor to:
maintain the session information records, each record associating session information, caller information and callee information for a respective IP communication session;
the session information including the caller and callee port identifiers identifying a caller port and a callee port respectively of the connection through which IP transmissions of the IP communication session are relayed;
the caller information including the caller IP address identifier and the caller port identifier to which IP transmissions received at the callee port are transmitted from the caller port, and a caller session identifier; and
the callee information including the callee IP address identifier and the callee port identifier to which IP transmissions received at the caller port are transmitted from the callee port, and a callee session identifier.

31. The non-transitory computer readable medium of claim 30, wherein the computer readable medium is further encoded with codes for directing the processor to:
store the session identifier received in the IP transmission in the caller session identifier field in the one of the session information records, when the pre-determined IP transmission is received from the caller; and
store the session identifier received in the IP transmission in the callee session identifier field in the one of the session information records, when the pre-determined IP transmission is received from the callee.

32. The non-transitory computer readable medium of claim 29, wherein the computer readable medium is further encoded with codes for directing the processor to:
forward the IP transmission to the callee at the callee IP address and callee port identified by the callee IP address identifier and callee port identifier respectively of the session information record; and
identify the source of the IP transmission forwarded to the callee with the callee port identifier, when the IP transmission was received at the caller port.

33. The non-transitory computer readable medium of claim 32, wherein the computer readable medium is further encoded with codes for directing the processor to:
forward the IP transmission to the caller at the caller IP address and caller port identified by the caller IP address identifier and caller port identifier respectively of the session information record; and
identify the source of the IP transmission forwarded to the caller with the caller port identifier, when the IP transmission was received at the callee port.

34. The non-transitory computer readable medium of claim 29, wherein the session identifier includes synchronization source (SSRC) identifier, the caller session identifier includes a caller SSRC identifier and the callee session identifier includes a callee SSRC identifier.

35. The non-transitory computer readable medium of claim 29, wherein the IP transmission contains real time transport protocol (RTP) data and wherein the caller port is a caller RTP port and the callee port is a callee RTP port.

* * * * *

UNITED STATES PATENT AND TRADEMARK OFFICE
CERTIFICATE OF CORRECTION

Page 1 of 1

PATENT NO.       : 9,154,417 B2
APPLICATION NO.  : 14/092831
DATED            : October 6, 2015
INVENTOR(S)      : Pentti Kalevi Huttunen It is certified that error appears in the above-identified patent and that said Letters Patent is hereby corrected as shown below:

Title Page References Cited:

In column 1 (page 6, item 56) at line 46, Under Other Publications, change "ViOP" to --VoIP--.

In column 2 (page 6, item 56) at line 61, Under Other Publications, After "No." insert --CN--.

In column 1 (page 7, item 56) at line 3, Under Other Publications, change "Ketchel" to --Ketchpel--.

In column 1 (page 7, item 56) at line 4, Under Other Publications, change "UNISEX" to --USENIX--.

In the Specification:

In column 9 at line 48, Change "station," to --station--.

In column 10 at line 56, Change "transferring." to --transferring--.

In column 14 at line 57, Change "identity" to --identify--.

Signed and Sealed this
Twenty-third Day of August, 2016

Michelle K. Lee
*Director of the United States Patent and Trademark Office*